(12) United States Patent
Lu

(10) Patent No.: US 9,967,195 B1
(45) Date of Patent: May 8, 2018

(54) ITERATIVE AUTOCORRELATION FUNCTION CALCULATION FOR BIG DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

(*) Notice: Subject to any disclaimer, the term of this patent is extended or adjusted under 35 U.S.C. 154(b) by 181 days.

(21) Appl. No.: 14/964,573

(22) Filed: Dec. 9, 2015

Related U.S. Application Data

(60) Provisional application No. 62/089,230, filed on Dec. 9, 2014.

(51) Int. Cl.
*G06F 15/16* (2006.01)
*H04L 12/813* (2013.01)
*G06F 17/30* (2006.01)
*H04L 29/08* (2006.01)

(52) U.S. Cl.
CPC ........ *H04L 47/20* (2013.01); *G06F 17/30876* (2013.01); *H04L 67/32* (2013.01)

(58) Field of Classification Search
CPC .................................................. G06F 17/18
USPC .......................................................... 709/234
See application file for complete search history.

(56) References Cited

U.S. PATENT DOCUMENTS

| 5,584,295 A * | 12/1996 | Muller ............... A61B 8/02 |
| | | 600/300 |
| 7,747,413 B2 | 6/2010 | Ramsey et al. |
| 7,840,377 B2 | 11/2010 | Ramsey et al. |
| 9,069,726 B2 | 6/2015 | Lu |
| 9,717,412 B2 * | 8/2017 | Roham ............... A61B 5/0011 |
| 2004/0073420 A1 * | 4/2004 | Lee ....................... G10L 25/90 |
| | | 704/207 |
| 2009/0216137 A1 * | 8/2009 | Holland ............... G06F 17/141 |
| | | 600/508 |
| 2014/0164456 A1 | 6/2014 | Lu |

FOREIGN PATENT DOCUMENTS

| WO | WO-2014093540 A2 | 6/2014 |
| WO | WO-2014093540 A3 | 9/2014 |

* cited by examiner

*Primary Examiner* — Hamza Algibhah

(57) ABSTRACT

The present invention extends to methods, systems, and computing device program products for iteratively calculating autocorrelation function for Big Data. Embodiments of the invention include iteratively calculating one or more components of an autocorrelation function at a specified range of lags in an adjusted computation window based on one or more components of an autocorrelation function at the specified range of lags calculated for a previous computation window and then calculating the autocorrelation function at the specified range of lags for the adjusted computation window using the iteratively calculated components. Iteratively calculating autocorrelation function avoids visiting all data elements in the adjusted computation window and performing redundant computations thereby increasing calculation efficiency, saving computing resources and reducing computing system's power consumption.

20 Claims, 30 Drawing Sheets

The Definition of Autocorrelation:

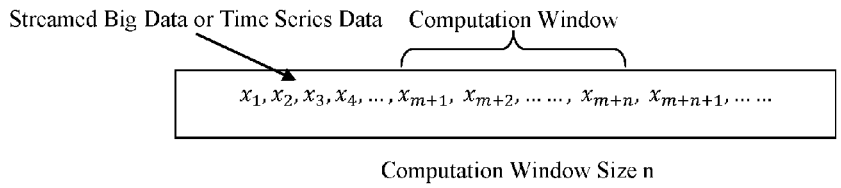

Computation Window Size n

Assume there is a streamed Big data or time series data: at time point $m+1$ get data $x_{m+1}$, and at time point $m+n$ get data $x_{m+n}$, ....... .

Define a computation window as a window on the streamed or time series data which contains the data elements to be involved in autocorrelation calculation. Assume there is a computation window $X$ composed of $n$ data elements: $X = (x_{m+1}, x_{m+2}, ......, x_{m+n})$ which is a window on a streamed Big Data or time series data. The computation window can move to either right or left direction. For example, when processing streamed data in real-time, the computation window moves to the right. In this case, a data is always added to the right side of the computation window and a data is always removed from the left side of the computation window. When recalculating autocorrelation on previous stream data, the computation window can move to the left. In this case, a data is added to the left side of the computation window and a data is removed from the right side of the computation window. Assume there is a need to calculate the autocorrelation within the computation window whenever the computation window either moves to right or left by one data element.

A new iteration of calculation is started each time there is a move of the computation window.

Define the sum of $X$ in the $k^{th}$ iteration as below:

$$S_k = x_{m+1} + x_{m+2} + x_{m+3} + \cdots + x_{m+n} = \sum_{m+1}^{m+n} x_i \qquad 401$$

Define the mean of $X$ in the $k^{th}$ iteration as below:

$$\bar{x}_k = \frac{(x_{m+1}+x_{m+2}+x_{m+3}+\cdots+x_{m+n})}{n} = \frac{\sum_{m+1}^{m+n} x_i}{n} \qquad 402$$

Assume $l$ is the lag, the autocorrelation of $X$ in the $k^{th}$ iteration is defined as:

$$\rho_{(k,l)} = \frac{\sum_{m+1+l}^{m+n}(x_i-\bar{x}_k)(x_{i-l}-\bar{x}_k)}{\sum_{m+1}^{m+n}(x_i-\bar{x}_k)^2} \qquad 403$$

Fig. 4A

Now, suppose the autocorrelation of the computation window $X$ with a fixed size $n$ needs to be calculated again after either of the following cases happens (when the computation window moves to right or left):

1. When a data element $x_{m+1}$ in $X$ is removed and a data element $x_{m+1+n}$ is added (The computation window moves to the right). Define the adjusted computation window as $X^I$.

Define the sum of $X^I$ in the k+1$^{th}$ iteration as below:

$$S^I_{k+1} = x_{m+2} + x_{m+3} + \cdots + x_{m+n} + x_{m+n+1} = \sum_{m+1+1}^{m+1+n} x_i \qquad \sim\!\!\!\_404$$

Define the mean of $X^I$ in the k+1$^{th}$ iteration as below:

$$\bar{x}^I_{k+1} = \frac{S^I_{k+1}}{n} = \frac{(x_{m+2} + x_{m+3} + \cdots + x_{m+n} + x_{m+n+1})}{n} = \frac{\sum_{m+1+1}^{m+1+n} x_i}{n} \qquad \sim\!\!\!\_405$$

The autocorrelation of $X^I$ at lag $l$ in the k+1$^{th}$ iteration is defined as:

$$\rho^I_{(k+1,l)} = \frac{\sum_{m+2+l}^{m+1+n}(x_i - \bar{x}^I_{k+1})(x_{i-l} - \bar{x}^I_{k+1})}{\sum_{m+1+1}^{m+1+n}(x_i - \bar{x}^I_{k+1})^2} \qquad \sim\!\!\!\_406$$

2. When a data element $x_{m+n}$ in $X$ is removed and a data element $x_m$ is added (The computation window moves to the left). Define the adjusted computation window as $X^{II}$.

Define the sum of $X^{II}$ in the k+1$^{th}$ iteration as below:

$$S^{II}_{k+1} = x_m + x_{m+1} + x_{m+2} + \cdots + x_{m+n} = \sum_{m}^{m+n} x_i \qquad \sim\!\!\!\_407$$

Define the mean of $X^{II}$ in the k+1$^{th}$ iteration as below:

$$\bar{x}^{II}_{k+1} = \frac{S^{II}_{k+1}}{n} = \frac{(x_m + x_{m+1} + x_{m+2} + \cdots + x_{m+n})}{n} = \frac{\sum_{m}^{m+n} x_i}{n} \qquad \sim\!\!\!\_408$$

The autocorrelation of $X^{II}$ at lag $l$ in the k+1$^{th}$ iteration is defined as:

$$\rho^{II}_{(k+1,l)} = \frac{\sum_{m+l}^{m+n}(x_i - \bar{x}^{II}_{k+1})(x_{i-l} - \bar{x}^{II}_{k+1})}{\sum_{m}^{m+n}(x_i - \bar{x}^{II}_{k+1})^2} \qquad \sim\!\!\!\_409$$

Fig. 4A Cont'd

Some Example Components of an Autocorrelation:

A component is a quantity or expression appearing in an autocorrelation's definition equation or any transforms of the definition equation. The following are a few example components of an autocorrelation.

- $S_k = \sum_1^n x_i$
- $\bar{x}_k = \frac{1}{n}\sum_1^n x_i$
- $SS_k = \sum_1^n x_i^2$
- $SX_k = \sum_1^n (x_i - \bar{x}_k)^2$
- $covX_{(k,l)} = \sum_{1+l}^n (x_i - \bar{x}_k)(x_{i-l} - \bar{x}_k)$  ($l$ is the lag)

Basic Iterative Component Calculation Equations:

The sum or mean of the data within a computation window will be used by several examples of iterative algorithms described in the following sections, so the equations are put here instead of in each algorithms.

According to equation 401 and equation 404, $S^I_{k+1}$ can be calculated in an iterative way:

$$S^I_{k+1} = S_k + x_{m+1+n} - x_{m+1} \quad \frown\!\!\smile 410$$

According to equation 402 and equation 405, $\bar{x}^I_{k+1}$ can be calculated in an iterative way:

$$\bar{x}^I_{k+1} = \bar{x}_k + \frac{(x_{m+1+n} - x_{m+1})}{n} \quad \frown\!\!\smile 411$$

According to equation 401 and equation 407, $S^{II}_{k+1}$ can be calculated in an iterative way:

$$S^{II}_{k+1} = S_k + x_m - x_{m+n} \quad \frown\!\!\smile 412$$

According to equation 402 and equation 408, $\bar{x}^{II}_{k+1}$ can be calculated in an iterative way:

$$\bar{x}^{II}_{k+1} = \bar{x}_k + \frac{(x_m - x_{m+n})}{n} \quad \frown\!\!\smile 413$$

Fig. 4B

Iterative Algorithm 1:

When the computation window moves to the right:

$$SS_k = \sum_{m+1}^{m+n} x_i^2 \qquad \text{414}$$

$$SS^I_{k+1} = \sum_{m+2}^{m+1+n} x_i^2 \qquad \text{415}$$

$SS^I_{k+1}$ can be calculated in an iterative way:

$$SS^I_{k+1} = SS_k + x_{m+1+n}^2 - x_{m+1}^2 \qquad \text{416}$$

$$SX_k = \sum_{m+1}^{m+n}(x_i - \bar{x}_k)^2 \qquad \text{417}$$

$$SX^I_{k+1} = \sum_{m+2}^{m+1+n}(x_i - \bar{x}^I_{k+1})^2 \qquad \text{418}$$

$SX^I_{k+1}$ can be calculated by using $S^I_{k+1}$ or $\bar{x}^I_{k+1}$ and $SS^I_{k+1}$ $$SX^I_{k+1} = SS^I_{k+1} - S^I_{k+1}\bar{x}^I_{k+1} = SS^I_{k+1} - S^I_{k+1}{}^2/n = SS^I_{k+1} - n\bar{x}^I_{k+1}{}^2 \qquad \text{419}$$

$$covX_{(k,l)} = \sum_{m+1+l}^{m+n}(x_i - \bar{x}_k)(x_{i-l} - \bar{x}_k) \qquad \text{420}$$

$$covX^I_{(k+1,l)} = \sum_{m+2+l}^{m+1+n}(x_i - \bar{x}^I_{k+1})(x_{i-l} - \bar{x}^I_{k+1}) \qquad \text{421}$$

$covX^I_{(k+1,l)}$ can be calculated in an iterative way:

$$covX^I_{(k+1,l)} = covX_{(k,l)} + x_{m+1+n}x_{m+1+n-l} - x_{m+1+l}x_{m+1} + \left(S^I_{k+1}\left(\sum_{m+1}^{m+1+l} x_i + \sum_{m+n+2-l}^{m+n} x_i - \frac{lS^I_{k+1}}{n}\right) - S_k\left(\sum_{m+2}^{m+l} x_i + \sum_{m+1+n-l}^{m+1+n} x_i - \frac{lS_k}{n}\right)\right)/n = covX_{(k,l)} + x_{m+1+n}x_{m+1+n-l} - x_{m+1+l}x_{m+1} + \bar{x}^I_{k+1}\left(\sum_{m+1}^{m+1+l} x_i + \sum_{m+n+2-l}^{m+n} x_i - l\bar{x}^I_{k+1}\right) - \bar{x}_k\left(\sum_{m+2}^{m+l} x_i + \sum_{m+1+n-l}^{m+1+n} x_i - l\bar{x}_k\right) \qquad \text{422}$$

The autocorrelation defined in equation 406 at lag $l$ can be calculated by using $covX^I_{(k+1,l)}$ and $SX^I_{k+1}$ $$\rho^I_{(k+1,l)} = \frac{covX^I_{(k+1,l)}}{SX^I_{k+1}} \qquad \text{423}$$

Fig. 4C

Iterative Algorithm 1 (cont'd):

When the computation window moves to the left:

$$SS_k = \sum_{m+1}^{m+n} x_i^2 \quad \text{424}$$

$$SS^{II}_{k+1} = \sum_{m}^{m-1+n} x_i^2 \quad \text{425}$$

$SS^{II}_{k+1}$ can be calculated in an iterative way:

$$SS^{II}_{k+1} = SS_k + x_m^2 - x_{m+n}^2 \quad \text{426}$$

$$SX_k = \sum_{m+1}^{m+n}(x_i - \bar{x}_k)^2 \quad \text{427}$$

$$SX^{II}_{k+1} = \sum_{m}^{m-1+n}(x_i - \bar{x}^{II}_{k+1})^2 \quad \text{428}$$

$SX^{II}_{k+1}$ can be calculated by using $S^{II}_{k+1}$ or $\bar{x}^{II}_{k+1}$ and $SS^{II}_{k+1}$ $$SX^{II}_{k+1} = SS^{II}_{k+1} - S^{II}_{k+1}\bar{x}^{II}_{k+1} = SS^{II}_{k+1} - S^{II}_{k+1}{}^2/n = SS^{II}_{k+1} - n\bar{x}^{II}_{k+1}{}^2 \quad \text{429}$$

$$covX_{(k,l)} = \sum_{m+1+l}^{m+n}(x_i - \bar{x}_k)(x_{i-l} - \bar{x}_k) \quad \text{430}$$

$$covX^{II}_{(k+1,l)} = \sum_{m+l}^{m-1+n}(x_i - \bar{x}^{II}_{k+1})(x_{i-l} - \bar{x}^{II}_{k+1}) \quad \text{431}$$

$covX^{II}_{(k+1,l)}$ can be calculated in an iterative way:

$$covX^{II}_{(k+1,l)} = covX_{(k,l)} + x_m x_{m+l} - x_{m+n-l} x_{m+n} + \left(S^{II}_{k+1}\left(\sum_{m+1}^{m+l-1} x_i + \sum_{m+n-l}^{m+n} x_i - kS^{II}_{k+1}/n\right) - S_k\left(\sum_{m}^{m+l} x_i + \sum_{m+n+1-l}^{m+n-1} x_i - kS_k/n\right)\right)/n = covX^{II}_{(k,l)} + x_m x_{m+l} - x_{m+n-l} x_{m+n} + \bar{x}^{II}_{k+1}\left(\sum_{m+1}^{m+l-1} x_i + \sum_{m+n-l}^{m+n} x_i - k\bar{x}^{II}_{k+1}\right) - \bar{x}_k\left(\sum_{m}^{m+l} x_i + \sum_{m+n+1-l}^{m+n-1} x_i - k\bar{x}_k\right) \quad \text{432}$$

The autocorrelation defined in equation 409 at lag $l$ can be calculated by using $covX^{II}_{(k+1,l)}$ and $SX^{II}_{k+1}$ $$\rho^{II}_{(k+1,l)} = \frac{covX^{II}_{(k+1,l)}}{SX^{II}_{k+1}} \quad \text{433}$$

Fig. 4C Cont'd

Iterative Algorithm 2:

When the computation window moves to the right:

$SX_k = \sum_{m+1}^{m+n}(x_i - \bar{x}_k)^2$     434

$SX^I_{k+1} = \sum_{m+2}^{m+1+n}(x_i - \bar{x}^I_{k+1})^2$     435

$SX^I_{k+1}$ can be iteratively calculated by using $S_k$ or $\bar{x}_k$ and $S^I_{k+1}$ calculated in equation 410 or $\bar{x}^I_{k+1}$ calculated in equation 411

$SX^I_{k+1} = SX_k + (x_{m+n+1} - x_{m+1})((x_{m+1+n}+x_{m+1}) - (S_k + S^I_{k+1})/n) = SX_k + (x_{m+1+n} - x_{m+1})((x_{m+1+n}+x_{m+1}) - (\bar{x}_k + \bar{x}^I_{k+1}))$     436

$covX_{(k,l)} = \sum_{m+1+l}^{m+n}(x_i - \bar{x}_k)(x_{i-l} - \bar{x}_k)$     437

$covX^I_{(k+1,l)} = \sum_{m+2+l}^{m+1+n}(x_i - \bar{x}^I_{k+1})(x_{i-l} - \bar{x}^I_{k+1})$     438

$covX^I_{(k+1,l)}$ can be calculated in an iterative way using $S_k$ or $\bar{x}_k$ and $S^I_{k+1}$ or $\bar{x}^I_{k+1}$:

$covX^I_{(k+1,l)} = covX_{(k,l)} + x_{m+1+n}x_{m+1+n-l} - x_{m+1+l}x_{m+1} + \left(S^I_{k+1}\left(\sum_{m+1}^{m+1+l}x_i + \sum_{m+n+2-l}^{m+n}x_i - \frac{lS^I_{k+1}}{n}\right) - S_k\left(\sum_{m+2}^{m+l}x_i + \sum_{m+1+n-l}^{m+1+n}x_i - \frac{lS_k}{n}\right)\right)/n = covX_{(k,l)} + x_{m+1+n}x_{m+1+n-l} - x_{m+1+l}x_{m+1} + \bar{x}^I_{k+1}\left(\sum_{m+1}^{m+1+l}x_i + \sum_{m+n+2-l}^{m+n}x_i - l\bar{x}^I_{k+1}\right) - \bar{x}_k\left(\sum_{m+2}^{m+l}x_i + \sum_{m+1+n-l}^{m+1+n}x_i - l\bar{x}_k\right)$     439

The autocorrelation defined in equation 406 at lag $k$ can be calculated by using $covX^I_{(k+1,k)}$ calculated in equation 439 and $SX^I_{k+1}$ calculated in equation 436

$\rho^I_{(k+1,l)} = \frac{covX^I_{(k+1,l)}}{SX^I_{k+1}}$     440

Fig. 4D

Iterative Algorithm 2 (cont'd):

When the computation window moves to the left:

$SX_k = \sum_{m+1}^{m+n}(x_i - \bar{x}_k)^2$ 441

$SX^{II}_{k+1} = \sum_{m}^{m+n-1}(x_i - \bar{x}^{II}_{k+1})^2$ 442

$SX^{II}_{k+1}$ can be iteratively calculated by using $S_k$ or $\bar{x}_k$ and $S^{II}_{k+1}$ calculated in equation 412 or $\bar{x}^{II}_{k+1}$ calculated in equation 413

$SX^{II}_{k+1} = SX_k + (x_{m+n+1} - x_{m+1})((x_{m+1+n}+x_{m+1}) - (S_k + S^{II}_{k+1})/n) = SX_k + (x_{m+1+n} - x_{m+1})((x_{m+1+n}+x_{m+1}) - (\bar{x}_k + \bar{x}^{II}_{k+1}))$ 443

$covX_{(k,l)} = \sum_{m+1+l}^{m+n}(x_i - \bar{x}_k)(x_{i-l} - \bar{x}_k)$ 444

$covX^{II}_{(k+1,l)} = \sum_{m+2+l}^{m+1+n}(x_i - \bar{x}^{II}_{k+1})(x_{i-l} - \bar{x}^{II}_{k+1})$ 445

$covX^{II}_{(k+1,l)}$ can be calculated in an iterative way using $S_k$ or $\bar{x}_k$ and $S^{II}_{k+1}$ or $\bar{x}^{II}_{k+1}$:

$covX^{II}_{(k+1,l)} = covX_{(k,l)} + x_m x_{m+l} - x_{m+n-l}x_{m+n} + (n+k)(S_k - S^{II}_{k+1})(S_k + S^{II}_{k+1})/n^2 + \left(S^{II}_{k+1}(\sum_{m}^{m+l-1} x_i + \sum_{m+n-l}^{m+n-1} x_i) - S_k(\sum_{m+1}^{m+l} x_i + \sum_{m+n+1-l}^{m+n} x_i)\right)/n = covX_{(k,l)} + x_m x_{m+l} - x_{m+n-l}x_{m+n} + (n+k)(\bar{x}_k - \bar{x}^{II}_{k+1})(\bar{x}_k + \bar{x}^{II}_{k+1}) + \bar{x}^{II}_{k+1}(\sum_{m}^{m+l-1} x_i + \sum_{m+n-l}^{m+n-1} x_i) - \bar{x}_k(\sum_{m+1}^{m+l} x_i + \sum_{m+n+1-l}^{m+n} x_i)$ 446

The autocorrelation defined in equation 409 at lag $k$ can be calculated by using $covX^{II}_{(k+1,k)}$ calculated in equation 446 and $SX^{II}_{k+1}$ calculated in equation 443

$\rho^{II}_{(k+1,l)} = \frac{covX^{II}_{(k+1,l)}}{SX^{II}_{k+1}}$ 447

Fig. 4D Cont'd

Iterative Algorithm 3:

When the computation window moves to the right:

$SX_k = \sum_{m+1}^{m+n}(x_i - \bar{x}_k)^2$ ⌒⌒⌒448

$SX^I{}_{k+1} = \sum_{m+2}^{m+1+n}(x_i - \bar{x}^I{}_{k+1})^2$ ⌒⌒⌒449

$SX^I{}_{k+1}$ can be iteratively calculated by using $S_k$ or $\bar{x}_k$ and $S^I{}_{k+1}$ calculated in equation 410 or $\bar{x}^I{}_{k+1}$ calculated in equation 411

$SX^I{}_{k+1} = SX_k + (x_{m+1+n} - x_{m+1})((x_{m+1+n}+x_{m+1}) - (S_k + S^I{}_{k+1})/n) = SX_k + (x_{m+1+n} - x_{m+1})((x_{m+1+n}+x_{m+1}) - (\bar{x}_k + \bar{x}^I{}_{k+1}))$ ⌒⌒⌒450

$covX_{(k,l)} = \sum_{m+1+l}^{m+n}(x_i - \bar{x}_k)(x_{i-l} - \bar{x}_k)$ ⌒⌒⌒451

$covX^I{}_{(k+1,l)} = \sum_{m+2+l}^{m+1+n}(x_i - \bar{x}^I{}_{k+1})(x_{i-l} - \bar{x}^I{}_{k+1})$ ⌒⌒⌒452

$covX^I{}_{(k+1,l)}$ can be calculated in an iterative way using $S_k$ or $\bar{x}_k$ and $S^I{}_{k+1}$ or $\bar{x}^I{}_{k+1}$:

$covX^I{}_{(k+1,l)} = covX_{(k,l)} + x_{m+1+n-l}(x_{m+1+n} - S_k/n) + x_{m+1+l}(S^I{}_{k+1}/n - x_{m+1}) + \left(x_{m+1}S^I{}_{k+1} - x_{m+1+n}S_k + (S^I{}_{k+1} - S_k)(\sum_{m+2}^{m+l}x_i + \sum_{m+n+2-l}^{m+n}x_i - l(S_k + S^I{}_{k+1})/n)\right)/n = covX_{(k,l)} + x_{m+1+n-l}(x_{m+1+n} - \bar{x}_k) + x_{m+1+l}(\bar{x}^I{}_{k+1} - x_{m+1}) + x_{m+1}\bar{x}^I{}_{k+1} - x_{m+1+n}\bar{x}_k + (\bar{x}^I{}_{k+1} - \bar{x}_k)\left(\sum_{m+2}^{m+l}x_i + \sum_{m+2+n-l}^{m+n}x_i - l(\bar{x}_k + \bar{x}^I{}_{k+1})\right)$ ⌒⌒⌒453

The autocorrelation defined in equation 406 at lag $l$ can be calculated by using $covX^I{}_{(k+1,l)}$ calculated in equation 453 and $SX^I{}_{k+1}$ calculated in equation 450

$\rho^I{}_{(k+1,l)} = \frac{covX^I{}_{(k+1,l)}}{SX^I{}_{k+1}}$ ⌒⌒⌒454

Fig. 4E

Iterative Algorithm 3 (cont'd):

When the computation window moves to the left:

$$SX_k = \sum_{m+1}^{m+n}(x_i - \bar{x}_k)^2 \quad \frown\!\!\smile 455$$

$$SX^{II}_{k+1} = \sum_{m}^{m+n-1}(x_i - \bar{x}^{II}_{k+1})^2 \quad \frown\!\!\smile 456$$

$SX^{II}_{k+1}$ can be iteratively calculated by using $S_k$ or $\bar{x}_k$ and $S^{II}_{k+1}$ calculated in equation 412 or $\bar{x}^{II}_{k+1}$ calculated in equation 413

$$SX^{II}_{k+1} = SX_k + (x_m - x_{m+n})((x_m + x_{m+n}) - (S_k + S^{II}_{k+1})/n) = SX_k + (x_m - x_{m+n})((x_m + x_{m+n}) - (\bar{x}_k + \bar{x}^{II}_{k+1})) \quad \frown\!\!\smile 457$$

$$covX_{(k,l)} = \sum_{m+1+l}^{m+n}(x_i - \bar{x}_k)(x_{i-l} - \bar{x}_k) \quad \frown\!\!\smile 458$$

$$covX^{II}_{(k+1,l)} = \sum_{m+2+l}^{m+1+n}(x_i - \bar{x}^{II}_{k+1})(x_{i-l} - \bar{x}^{II}_{k+1}) \quad \frown\!\!\smile 459$$

$covX^{II}_{(k+1,l)}$ can be calculated in an iterative way using $S_k$ or $\bar{x}_k$ and $S^{II}_{k+1}$ or $\bar{x}^{II}_{k+1}$:

$$covX^{II}_{(k+1,l)} = covX_{(k,l)} + x_{m+1+n-l}(x_{m+1+n} - S_k/n) + x_{m+1+l}(S^{II}_{k+1}/n - x_{m+1}) +$$
$$\left(x_{m+1}S^{II}_{k+1} - x_{m+1+n}S_k + (S^{II}_{k+1} - S_k)(\sum_{m+2}^{m+l} x_i + \sum_{m+n+2-l}^{m+n} x_i - l(S_k + S^{II}_{k+1})/n)\right)/n =$$
$$covX_{(k,l)} + x_{m+l}(x_m - \bar{x}_k) + x_{m+n-l}(\bar{x}^{II}_{k+1} - x_{m+n}) + x_m \bar{x}^{II}_{k+1} - x_{m+n}\bar{x}_k + (\bar{x}^{II}_{k+1} -$$
$$\bar{x}_k)\left(\sum_{m+1}^{m+l-1} x_i + \sum_{m+1+n-l}^{m+n-1} x_i - (n+l)(\bar{x}_k + \bar{x}^{II}_{k+1})\right) \quad \frown\!\!\smile 460$$

The autocorrelation defined in equation 409 at lag $l$ can be calculated by using $covX^{II}_{(k+1,l)}$ calculated in equation 460 and $SX^{II}_{k+1}$ calculated in equation 457

$$\rho^{II}_{(k+1,l)} = \frac{covX^{II}_{(k+1,l)}}{SX^{II}_{k+1}} \quad \frown\!\!\smile 461$$

Fig. 4E Cont'd

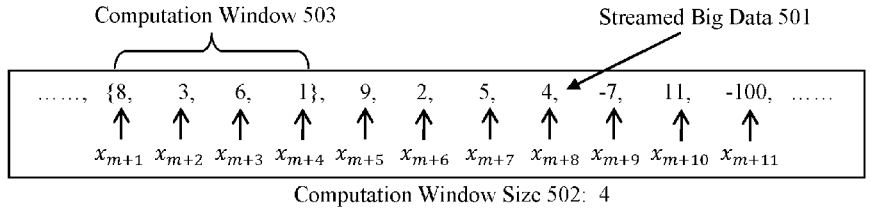

Computation Window Size 502: 4

Calculate Autocorrelation at lag 1 and lag 2 Respectively for Computation Window 503

Traditional Algorithm:

1. Calculate $\bar{x}_1$ for the 1$^{st}$ iteration:

$$\bar{x}_1 = \frac{8+3+6+1}{4} = \frac{18}{4} = 4.5$$

Operations in this step: 1 division, 3 additions

2. Calculate $\sum_{m+1}^{m+4}(x_i - \bar{x}_1)^2$ for the 1$^{st}$ iteration:

$$\sum_{m+1}^{m+4}(x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

3. Calculate $\sum_{m+1+1}^{m+4}(x_i - \bar{x}_1)(x_{i-1} - \bar{x}_1)$ for the 1$^{st}$ iteration:

$$\sum_{m+1+1}^{m+4}(x_i - \bar{x}_1)(x_{i-1} - \bar{x}_1) = (x_{m+2} - \bar{x}_1)(x_{m+1} - \bar{x}_1) + (x_{m+3} - \bar{x}_1)(x_{m+2} - \bar{x}_1) + (x_{m+4} - \bar{x}_1)(x_{m+3} - \bar{x}_1) = (3 - 4.5)(8 - 4.5) + (6 - 4.5)(3 - 4.5) + (1 - 4.5)(6 - 4.5) = (-1.5)(3.5) + (1.5)(-1.5) + (-3.5)(1.5) = -5.25 - 2.25 - 5.25 = -12.75$$

Operations in this step: 3 multiplications, 2 additions, 6 subtractions

4. Calculate $\sum_{m+1+2}^{m+4}(x_i - \bar{x}_1)(x_{i-2} - \bar{x}_1)$ for the 1$^{st}$ iteration:

$$\sum_{m+1+2}^{m+4}(x_i - \bar{x}_1)(x_{i-2} - \bar{x}_1) = (x_{m+3} - \bar{x}_1)(x_{m+1} - \bar{x}_1) + (x_{m+4} - \bar{x}_1)(x_{m+2} - \bar{x}_1) = (6 - 4.5)(8 - 4.5) + (1 - 4.5)(3 - 4.5) = (1.5)(3.5) + (-3.5)(-1.5) = 5.25 + 5.25 = 10.5$$

Operations in this step: 2 multiplications, 1 addition, 4 subtractions

5. Calculate the autocorrelation $\rho_{(1,1)}$ and $\rho_{(1,2)}$ for the 1$^{st}$ iteration:

$$\rho_{(1,1)} = \frac{\sum_{m+1+1}^{m+4}(x_i - \bar{x}_1)(x_{i-1} - \bar{x}_1)}{\sum_{m+1}^{m+4}(x_i - \bar{x}_1)^2} = \frac{-12.75}{29} = -0.4396551724137931$$

$$\rho_{(1,2)} = \frac{\sum_{m+1+2}^{m+4}(x_i - \bar{x}_1)(x_{i-2} - \bar{x}_1)}{\sum_{m+1}^{m+4}(x_i - \bar{x}_1)^2} = \frac{10.5}{29} = 0.3620689655172414$$

Operations in this step: 2 divisions

There are a total of 3 divisions, 9 multiplications, 9 additions and 14 subtractions when calculating the autocorrelation at lag $l = 1$ and lag $l = 2$ respectively for a computation window of length 4.

Traditional algorithms for calculating autocorrelation on $n$ data elements at lags from 1 to $l$ will typically take a total of $1 + l$ divisions, $n + \sum_1^l(n - i) = (1 + l)n - \sum_1^l i$ multiplications, $2(n - 1) + \sum_1^l(n - i - 1) = (2 + l)(n - 1) - \sum_1^l i$ additions, and $n + 2\sum_1^l(n - i) = (1 + 2l)n - 2\sum_1^l i$ subtractions without any optimization.

Fig. 5A

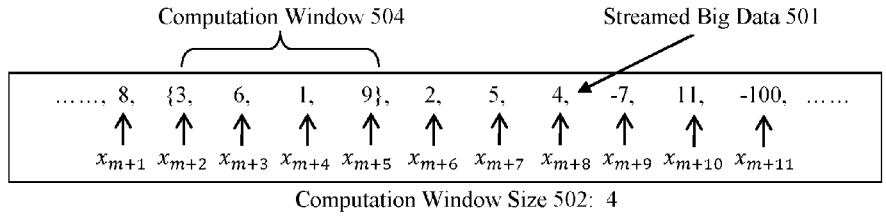

Computation Window Size 502: 4

Calculate Autocorrelation at lag 1 and lag 2 Respectively for Computation Window 504

Traditional Algorithm:

1. Calculate $\bar{x}_2$ for the 2$^{nd}$ iteration:

$$\bar{x}_2 = \frac{3+6+1+9}{4} = \frac{19}{4} = 4.75$$

Operations in this step: 1 division, 3 additions

2. Calculate $\sum_{m+2}^{m+1+4}(x_i - \bar{x}_2)^2$ for the 2$^{nd}$ iteration:

$$\sum_{m+2}^{m+1+4}(x_i - \bar{x}_2)^2 = (3 - 4.75)^2 + (6 - 4.75)^2 + (1 - 4.75)^2 + (9 - 4.75)^2 = 36.75$$

Operations in this step: 4 multiplications, 3 additions, 4 subtractions

3. Calculate $\sum_{m+2+1}^{m+1+4}(x_i - \bar{x}_2)(x_{i-1} - \bar{x}_2)$ for the 2$^{nd}$ iteration:

$$\sum_{m+2+1}^{m+1+4}(x_i - \bar{x}_2)(x_{i-1} - \bar{x}_2) = (x_{m+3} - \bar{x}_2)(x_{m+2} - \bar{x}_2) + (x_{m+4} - \bar{x}_2)(x_{m+3} - \bar{x}_2) +$$
$$(x_{m+5} - \bar{x}_2)(x_{m+4} - \bar{x}_2) = (6 - 4.75)(3 - 4.75) + (1 - 4.75)(6 - 4.75) + (9 - 4.75)(1 - 4.75) =$$
$$(1.25)(-1.75) + (-3.75)(1.25) + (4.25)(-3.75) = -2.1875 - 4.6875 - 15.9375 = -22.8125$$

Operations in this step: 3 multiplications, 2 additions, 6 subtractions

4. Calculate $\sum_{m+2+2}^{m+1+4}(x_i - \bar{x}_2)(x_{i-2} - \bar{x}_2)$ for the 2$^{nd}$ iteration:

$$\sum_{m+2+2}^{m+1+4}(x_i - \bar{x}_2)(x_{i-2} - \bar{x}_2) = (x_{m+4} - \bar{x}_2)(x_{m+2} - \bar{x}_2) + (x_{m+5} - \bar{x}_2)(x_{m+3} - \bar{x}_2) =$$
$$(1 - 4.75)(3 - 4.75) + (9 - 4.75)(6 - 4.75) = (-3.75)(-1.75) + (4.25)(1.25) = 6.5625 +$$
$$5.3125 = 11.875$$

Operations in this step: 2 multiplications, 1 addition, 4 subtractions

5. Calculate the autocorrelation $\rho_{(2,1)}$ and $\rho_{(2,2)}$ for the 2$^{nd}$ iteration:

$$\rho_{(2,1)} = \frac{\sum_{m+2+1}^{m+1+4}(x_i - \bar{x}_2)(x_{i-1} - \bar{x}_2)}{\sum_{m+2}^{m+5}(x_i - \bar{x}_2)^2} = \frac{-22.8125}{36.75} = -0.6207482993197279$$

$$\rho_{(2,2)} = \frac{\sum_{m+2+2}^{m+1+4}(x_i - \bar{x}_2)(x_{i-2} - \bar{x}_2)}{\sum_{m+2}^{m+5}(x_i - \bar{x}_2)^2} = \frac{11.875}{36.75} = 0.3231292517006803$$

Operations in this step: 2 divisions

There are a total of 3 divisions, 9 multiplications, 9 additions and 14 subtractions when calculating the autocorrelation at lag $l = 1$ and lag $l = 2$ respectively for a computation window of size 4.

Fig. 5A Cont'd 1

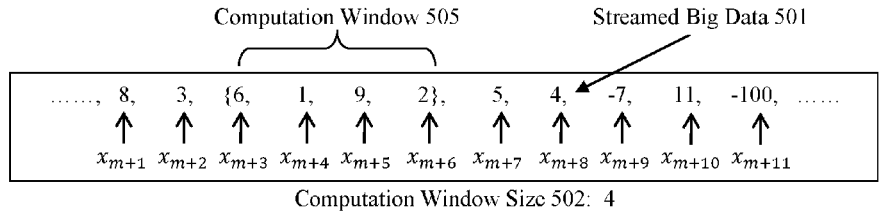

Computation Window Size 502: 4

Calculate Autocorrelation at lag 1 and lag 2 Respectively for Computation Window 505

Traditional Algorithm:

1. Calculate $\bar{x}_3$ for the 3$^{rd}$ iteration:

$$\bar{x}_3 = \frac{6+1+9+2}{4} = \frac{18}{4} = 4.5$$

Operations in this step: 1 division, 3 additions

2. Calculate $\sum_{m+3}^{m+2+4}(x_i - \bar{x}_3)^2$ for the 3$^{rd}$ iteration:

$$\sum_{m+3}^{m+2+4}(x_i - \bar{x}_3)^2 = (6 - 4.5)^2 + (1 - 4.5)^2 + (9 - 4.5)^2 + (2 - 4.5)^2 = 41$$

Operations in this step: 4 multiplications, 3 additions, 4 subtractions

3. Calculate $\sum_{m+3+1}^{m+2+4}(x_i - \bar{x}_3)(x_{i-1} - \bar{x}_3)$ for the 3$^{rd}$ iteration:

$$\sum_{m+3+1}^{m+2+4}(x_i - \bar{x}_3)(x_{i-1} - \bar{x}_3) = (x_{m+4} - \bar{x}_3)(x_{m+3} - \bar{x}_3) + (x_{m+5} - \bar{x}_3)(x_{m+4} - \bar{x}_3) + (x_{m+6} - \bar{x}_3)(x_{m+5} - \bar{x}_3) = (1 - 4.5)(6 - 4.5) + (9 - 4.5)(1 - 4.5) + (2 - 4.5)(9 - 4.5) = (-3.5)(1.5) + (4.5)(-3.5) + (-2.5)(4.5) = -5.25 - 15.75 - 11.25 = -32.25$$

Operations in this step: 3 multiplications, 2 additions, 6 subtractions

4. Calculate $\sum_{m+3+2}^{m+2+4}(x_i - \bar{x}_3)(x_{i-2} - \bar{x}_3)$ for the 3$^{rd}$ iteration:

$$\sum_{m+3+2}^{m+2+4}(x_i - \bar{x}_3)(x_{i-2} - \bar{x}_3) = (x_{m+5} - \bar{x}_3)(x_{m+3} - \bar{x}_3) + (x_{m+6} - \bar{x}_3)(x_{m+4} - \bar{x}_3) = (9 - 4.5)(6 - 4.5) + (2 - 4.5)(1 - 4.5) = (4.5)(1.5) + (-2.5)(-3.5) = 6.75 + 8.75 = 15.5$$

Operations in this step: 2 multiplications, 1 addition, 4 subtractions

5. Calculate the autocorrelation $\rho_{(3,1)}$ and $\rho_{(3,2)}$ for the 3$^{rd}$ iteration:

$$\rho_{(3,1)} = \frac{\sum_{m+3+1}^{m+2+4}(x_i - \bar{x}_3)(x_{i-1} - \bar{x}_3)}{\sum_{m+3}^{m+2+4}(x_i - \bar{x}_3)^2} = \frac{-32.25}{41} = -0.7865853658536585$$

$$\rho_{(3,2)} = \frac{\sum_{m+3+2}^{m+2+4}(x_i - \bar{x}_3)(x_{i-2} - \bar{x}_3)}{\sum_{m+3}^{m+2+4}(x_i - \bar{x}_3)^2} = \frac{15.5}{41} = 0.3780487804878049$$

Operations in this step: 2 divisions

There are a total of 3 divisions, 9 multiplications, 9 additions and 14 subtractions when calculating the autocorrelation at lag $l - 1$ and lag $l - 2$ respectively on a moving computation window of length 4.

Fig. 5A Cont'd 2

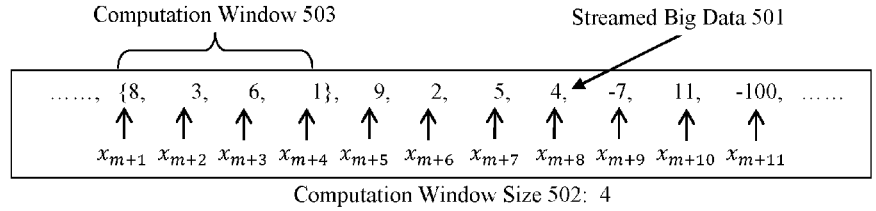

Computation Window Size 502: 4

Calculate Autocorrelation at lag 1 and lag 2 Respectively for Computation Window 503

Iterative Algorithm 1:

1. Use equation 402 to calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 414 to calculate $SS_1$ for the 1st iteration:

$$SS_1 = \sum_{m+1}^{m+4} x_i^2 = 8^2 + 3^2 + 6^2 + 1^2 = 64 + 9 + 36 + 1 = 110$$

Operations in this step: 4 multiplications, 3 additions

3. Use equation 417 to calculate $SX_1$ for the 1st iteration:

$$SX_1 = SS_1 - 4\bar{x}_1^2 = 110 - 4 \times 4.5^2 = 110 - 4 \times 4.5^2 = 110 - 4 \times 20.25 = 110 - 81 = 29$$

Operations in this step: 2 multiplications, 1 subtraction

4. Use equation 420 to calculate $covX_{(1,1)}$ for the 1st iteration:

$$covX_{(1,1)} = \sum_{m+1+1}^{m+4}(x_i - \bar{x}_1)(x_{i-1} - \bar{x}_1) = (3 - 4.5)(8 - 4.5) + (6 - 4.5)(3 - 4.5) + (1 - 4.5)(6 - 4.5) = (-1.5)(3.5) + (1.5)(-1.5) + (-3.5)(1.5) = -5.25 - 2.25 - 5.25 = -12.75$$

Operations in this step: 3 multiplications, 2 additions, 6 subtractions

5. Use equation 420 to calculate $covX_{(1,2)}$ for the 1st iteration:

$$covX_{(1,2)} = \sum_{m+2+1}^{m+4}(x_i - \bar{x}_1)(x_{i-2} - \bar{x}_1) = (6 - 4.5)(8 - 4.5) + (1 - 4.5)(3 - 4.5) = 10.5$$

Operations in this step: 2 multiplications, 1 addition, 4 subtractions

6. Use equation 423 to calculate the autocorrelation $\rho_{(1,1)}$ and $\rho_{(1,2)}$ respectively for the 1st iteration:

$$\rho_{(1,1)} = \frac{covX_{(1,1)}}{SX_1} = \frac{-12.75}{29} = -0.4396551724137931$$

$$\rho_{(1,2)} = \frac{covX_{(1,2)}}{SX_1} = \frac{10.5}{29} = 0.3620689655172414$$

Operations in this step: 2 divisions.

There are a total of 3 divisions, 11 multiplications, 9 additions and 11 subtractions when calculating the autocorrelation at lag $l = 1$ and lag $l = 2$ respectively for a computation window of size 4.

Fig. 5B

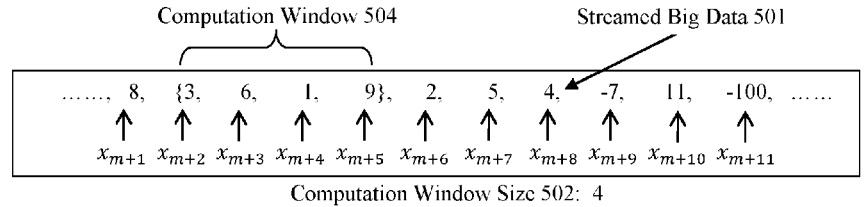

Computation Window Size 502: 4

Calculate Autocorrelation at lag 1 and lag 2 Respectively for Computation Window 504

Iterative Algorithm 1:

1. Use equation 411 to iteratively calculate $\bar{x}_2$ for the 2nd iteration:

$$\bar{x}_2 = \bar{x}_1 + \frac{(x_{m+5} - x_{m+1})}{4} = 4.5 + \frac{(9-8)}{4} = 4.5 + \frac{1}{4} = 4.75$$

Operations in this step: 1 division, 1 addition, 1 subtraction

2. Use equation 416 to iteratively calculate $SS_2$ for the 2nd iteration:

$$SS_2 = SS_1 + x_{m+1+4}^2 - x_{m+1}^2 = 110 + 9^2 - 8^2 = 110 + 81 - 64 = 127$$

Operations in this step: 2 multiplications, 1 addition, 1 subtraction

3. Use equation 419 to iteratively calculate $SX_2$ for the 2nd iteration:

$$SX_2 = SS_2 - 4\bar{x}_2^2 = 127 - 4 \times 4.75^2 = 127 - 90.25 = 36.75$$

Operations in this step: 2 multiplications, 1 subtraction

4. Use equation 422 to iteratively calculate $covX_{(2,1)}$ (at lag $l=1$) for the 2nd iteration:

$$covX_{(2,1)} = covX_{(1,1)} + x_{m+1+4}x_{m+1+4-1} - x_{m+1+1}x_{m+1} + \bar{x}_2(\sum_{m+1}^{m+1+1} x_i + \sum_{m+2+4-1}^{m+4} x_i - 1 \times \bar{x}_2) - \bar{x}_1(\sum_{m+2}^{m+1} x_i + \sum_{m+1+4-1}^{m+1+4} x_i - 1 \times \bar{x}_1) = -12.75 + 9 \times 1 - 3 \times 8 + 4.75(8 + 3 - 4.75) - 4.5(1 + 9 - 4.5) = -22.8125$$

Operations in this step: 6 multiplications, 6 additions, 4 subtractions

5. Use equation 422 to iteratively calculate $covX_{(2,2)}$ (at lag $l=2$) for the 2nd iteration:

$$covX_{(2,2)} = covX_{(1,2)} + x_{m+1+4}x_{m+1+4-2} - x_{m+1+2}x_{m+1} + \bar{x}_2(\sum_{m+1}^{m+1+2} x_i + \sum_{m+2+4-2}^{m+4} x_i - 2\bar{x}_2) - \bar{x}_1(\sum_{m+2}^{m+2} x_i + \sum_{m+1+4-2}^{m+1+4} x_i - 2\bar{x}_1) = 10.5 + 9 \times 6 - 6 \times 8 + 4.75(8 + 3 + 6 + 1 - 2 \times 4.75) - 4.5(6 + 1 + 9 + 3 - 2 \times 4.5) = 11.875$$

Operations in this step: 6 multiplications, 8 additions, 4 subtractions

6. Use equation 423 to calculate the autocorrelation $\rho_{(2,1)}$ and $\rho_{(2,2)}$ respectively for the 2nd iteration:

$$\rho_{(2,1)} = \frac{covX_{(2,1)}}{SX_2} = \frac{-22.8125}{36.75} = -0.6207482993197279$$

$$\rho_{(2,2)} = \frac{covX_{(2,2)}}{SX_2} = \frac{11.875}{36.75} = 0.3231292517006803$$

Operations in this step: 2 divisions.

There are a total of 3 divisions, 16 multiplications, 16 additions and 11 subtractions when calculating the autocorrelation at lag $l = 1$ and lag $l = 2$ respectively for a computation window of size 4.

Fig. 5B Cont'd 1

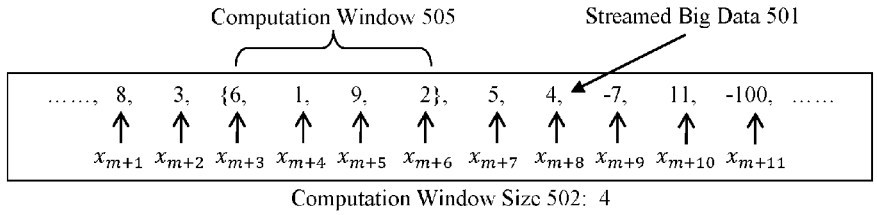

Computation Window Size 502: 4

Calculate Autocorrelation at lag 1 and lag 2 Respectively for Computation Window 505

Iterative Algorithm 1:

1. Use equation 411 to iteratively calculate $\bar{x}_3$ for the 3rd iteration:

$$\bar{x}_3 = \bar{x}_2 + \frac{(x_{m+1+4} - x_{m+1})}{4} = 4.75 + \frac{(2-3)}{4} = 4.75 + \frac{-1}{4} = 4.5$$

Operations in this step: 1 division, 1 addition, subtraction

2. Use equation 416 to iteratively calculate $SS_3$ for the 3rd iteration:

$$SS_3 = SS_2 + x_{m+1+4}^2 - x_{m+1}^2 = 127 + 2^2 - 3^2 = 127 + 4 - 9 = 122$$

Operations in this step: 2 multiplications, 1 addition, 1 subtraction

3. Use equation 419 to iteratively calculate $SX_3$ for the 3rd iteration:

$$SX_3 = SS_3 - 4\bar{x}_3^2 = 122 - 4 \times 4.5^2 = 122 - 81 = 41$$

Operations in this step: 2 multiplications, 1 subtraction

4. Use equation 422 to iteratively calculate $covX_{(3,1)}$ for the 3rd iteration:

$$covX_{(3,1)} = covX_{(2,1)} + x_{m+2+4}x_{m+2+4-1} - x_{m+2+1}x_{m+2} + \bar{x}_3(\sum_{m+2}^{m+2+1} x_i + \sum_{m+1+4+2-1}^{m+1+4} x_i - 1 \times \bar{x}_3) - \bar{x}_2(\sum_{m+2+1}^{m+1+1+1} x_i + \sum_{m+2+4-1}^{m+2+4} x_i - 1 \times \bar{x}_2) = -22.8125 + 2 \times 9 - 6 \times 3 + 4.5(3 + 6 - 4.5) - 4.75(2 + 9 - 4.75) = -32.25$$

Operations in this step: 6 multiplications, 6 additions, 4 subtractions

5. Use equation 422 to iteratively calculate $covX_{(3,2)}$ for the 3rd iteration:

$$covX_{(3,2)} = covX_{(2,2)} + x_{m+2+4}x_{m+2+4-2} - x_{m+2+2}x_{m+2} + \bar{x}_3(\sum_{m+2}^{m+2+2} x_i + \sum_{m+1+4+2-2}^{m+1+4} x_i - 2 \times \bar{x}_3) - \bar{x}_2(\sum_{m+2+1}^{m+1+1+2} x_i + \sum_{m+2+4-2}^{m+2+4} x_i - 2 \times \bar{x}_2) = 11.875 + 2 \times 1 - 1 \times 3 + 4.5(3 + 6 + 1 + 9 - 2 \times 4.5) - 4.75(2 + 6 + 1 + 9 - 2 \times 4.75) = 15.5$$

Operations in this step: 6 multiplications, 8 additions, 4 subtractions

6. Use equation 423 to calculate the autocorrelation $\rho_{(3,1)}$ and $\rho_{(3,2)}$ respectively for the 3rd iteration:

$$\rho_{(3,1)} = \frac{covX_{(3,1)}}{SX_3} = \frac{-32.25}{41} = -0.7865853658536585$$

$$\rho_{(3,2)} = \frac{covX_{(3,2)}}{SX_3} = \frac{15.5}{41} = 0.3780487804878049$$

Operations in this step: 2 divisions

There are a total of 3 divisions, 16 multiplications, 16 additions and 11 subtractions when calculating the autocorrelation at lag $l = 1$ and lag $l = 2$ respectively for a computation window of size 4.

Fig. 5B Cont'd 2

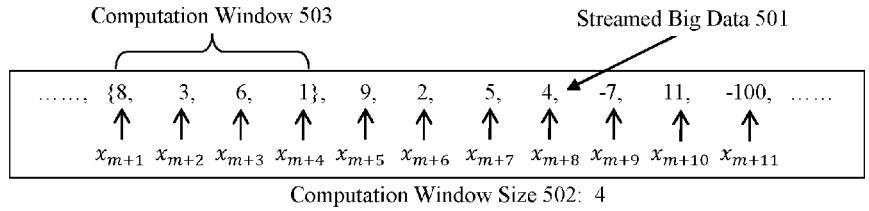

Computation Window Size 502: 4

Calculate Autocorrelation at lag 1 and lag 2 Respectively for Computation Window 503

Iterative Algorithm 2:

1. Use equation 402 to calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Calculate $SX_1$ for the 1st iteration:

$$SX_1 = \sum_{m+1}^{m+4}(x_i - \bar{x}_1)^2 = (8-4.5)^2 + (3-4.5)^2 + (6-4.5)^2 + (1-4.5)^2 = 29$$

Operations in this step: 4 multiplications, 3 additions, 4 subtractions

3. Calculate $covX_{(1,1)}$ for the 1st iteration:

$$covX_{(1,1)} = \sum_{m+1+1}^{m+4}(x_i - \bar{x}_1)(x_{i-1} - \bar{x}_1) = (3-4.5)(8-4.5) + (6-4.5)(3-4.5) + (1-4.5)(6-4.5) = (-1.5)(3.5) + (1.5)(-1.5) + (-3.5)(1.5) = -5.25 - 2.25 - 5.25 = -12.75$$

Operations in this step: 3 multiplications, 2 additions, 6 subtractions

4. Calculate $covX_{(1,2)}$ for the 1st iteration:

$$covX_{(1,2)} = \sum_{m+1+2}^{m+4}(x_i - \bar{x}_1)(x_{i-2} - \bar{x}_1) = (6-4.5)(8-4.5) + (1-4.5)(3-4.5) = 10.5$$

Operations in this step: 2 multiplications, 1 addition, 4 subtractions

5. Calculate the autocorrelation $\rho_{(1,1)}$ and $\rho_{(1,2)}$ respectively for the 1st iteration:

$$\rho_{(1,1)} = \frac{covX_{(1,1)}}{SX_1} = \frac{-12.75}{29} = -0.4396551724137931$$

$$\rho_{(1,2)} = \frac{covX_{(1,2)}}{SX_1} = \frac{10.5}{29} = 0.3620689655172414$$

Operations in this step: 2 divisions

There are a total of 3 divisions, 9 multiplications, 9 additions and 14 subtractions when calculating the autocorrelation at lag $l = 1$ and lag $l = 2$ respectively for a computation window of size 4.

Fig. 5C

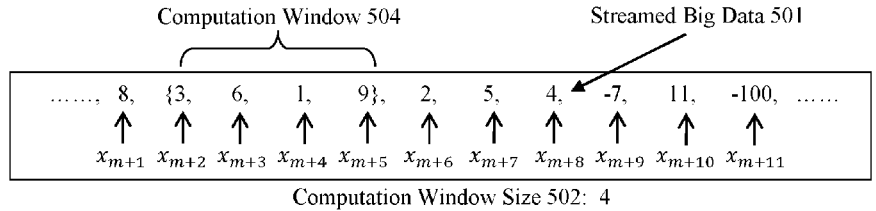

Computation Window Size 502: 4

Calculate Autocorrelation at lag 1 and lag 2 Respectively for Computation Window 504

Iterative Algorithm 2:

1. Use equation 411 to iteratively calculate $\bar{x}_2$ for the 2$^{nd}$ iteration:

$$\bar{x}_2 = \bar{x}_1 + \frac{(x_{m+1+4} - x_{m+1})}{4} = 4.5 + \frac{(9-8)}{4} = 4.5 + \frac{1}{4} = 4.75$$

Operations in this step: 1 division, 1 addition, 1 subtraction

2. Use equation 436 to iteratively calculate $SX_2$ for the 2$^{nd}$ iteration:

$$SX_2 = SX_1 + (x_{m+1+4} - x_{m+1})\big((x_{m+1+4} + x_{m+1}) - (\bar{x}_1 + \bar{x}_2)\big)$$
$$= 29 + (9 - 8)\big((9 + 8) - (4.5 + 4.75)\big) = 36.75$$

Operations in this step: 1 multiplication, 3 additions, 2 subtractions

3. Use equation 439 to iteratively calculate $covX_{(2,1)}$ (at lag $l = 1$) for the 2$^{nd}$ iteration:

$$covX_{(2,1)} = covX_{(1,1)} + x_{m+1+4}x_{m+1+4-1} - x_{m+1+1}x_{m+1} + \bar{x}_2(\sum_{m+1}^{m+1+1} x_i + \sum_{m+4+2-1}^{m+4} x_i - 1 \times \bar{x}_2) - \bar{x}_1(\sum_{m+2}^{m+1} x_i + \sum_{m+1+4-1}^{m+1+4} x_i - 1 \times \bar{x}_1) = -12.75 + 9 \times 1 - 3 \times 8 + 4.75(8 + 3 - 4.75) - 4.5(9 + 1 - 4.5) = -22.8125$$

Operations in this step: 6 multiplications, 6 additions, 4 subtractions

4. Use equation 439 to iteratively calculate $covX_{(2,2)}$ (at lag $l = 2$) for the 2$^{nd}$ iteration:

$$covX_{(2,2)} = covX_{(1,2)} + x_{m+1+4}x_{m+1+4-2} - x_{m+1+2}x_{m+1} + \bar{x}_2(\sum_{m+1}^{m+1+2} x_i + \sum_{m+4+2-2}^{m+4} x_i - 2 \times \bar{x}_2) - \bar{x}_1(\sum_{m+2}^{m+2} x_i + \sum_{m+1+4-2}^{m+1+4} x_i - 2 \times \bar{x}_1) = 10.5 + 9 \times 6 - 6 \times 8 + 4.75(8 + 3 + 6 + 1 - 2 \times 4.75) - 4.5(9 + 3 + 6 + 1 - 2 \times 4.5) = 11.875$$

Operations in this step: 6 multiplications, 8 additions, 4 subtractions

5. Use equation 440 to calculate the autocorrelation $\rho_{(2,1)}$ and $\rho_{(2,2)}$ respectively for the 2$^{nd}$ iteration:

$$\rho_{(2,1)} = \frac{covX_{(2,1)}}{SX_2} = \frac{-22.8125}{36.75} = -0.6207482993197279$$

$$\rho_{(2,2)} = \frac{covX_{(2,2)}}{SX_2} = \frac{11.875}{36.75} = 0.3231292517006803$$

Operations in this step: 2 divisions.

There are a total of 3 divisions, 13 multiplications, 18 additions and 11 subtractions when calculating the autocorrelation at lag $l = 1$ and lag $l = 2$ respectively for a computation window of size 4.

Fig. 5C Cont'd 1

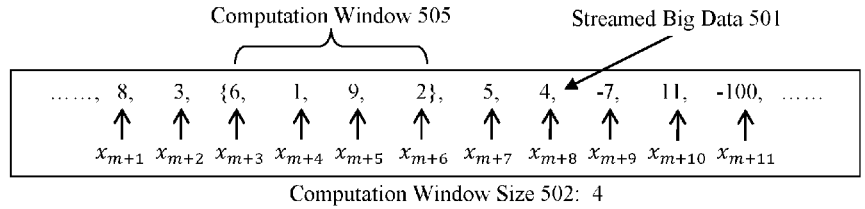

Computation Window Size 502: 4

Calculate Autocorrelation at lag 1 and lag 2 Respectively for Computation Window 505

Iterative Algorithm 2:

1. Use equation 411 to iteratively calculate $\bar{x}_3$ for the 3$^{rd}$ iteration:

$$\bar{x}_3 = \bar{x}_2 + \frac{(x_{m+2+4} - x_{m+2})}{4} = 4.75 + \frac{(2-3)}{4} = 4.75 + \frac{-1}{4} = 4.5$$

Operations in this step: 1 division, 1 addition, 1 subtraction

2. Use equation 436 to iteratively calculate $SX_3$ for the 3$^{rd}$ iteration:

$SX_3 = SX_2 + (x_{m+2+4} - x_{m+2})((x_{m+2+4} + x_{m+2}) - (\bar{x}_2 + \bar{x}_3))$
$= 36.75 + (2 - 3)((2 + 3) - (4.75 + 4.5)) = 41$ Operations in this step: 1 multiplication, 3 additions, 2 subtractions 3. Use equation 439 to iteratively calculate $covX_{(3,1)}$ (at lag $l=1$) for the 3$^{rd}$ iteration:

$covX_{(3,1)} = covX_{(2,1)} + x_{m+2+4}x_{m+2+4-1} - x_{m+2+1}x_{m+2} + \bar{x}_3(\sum_{m+2}^{m+2+1} x_i + \sum_{5+2-1}^{5} x_i - 1 \times \bar{x}_3) -$
$\bar{x}_2(\sum_{m+3}^{m+1+1} x_i + \sum_{m+2+4-1}^{m+2+4} x_i - 1 \times \bar{x}_2) = -22.8125 + 2 \times 9 - 6 \times 3 + 4.5(3 + 6 - 4.5) -$
$4.75(2 + 9 - 4.75) = -32.25$ Operations in this step: 6 multiplications, 6 additions, 4 subtractions 4. Use equation 439 to iteratively calculate $covX_{(3,2)}$ (at lag $l=2$) for the 3$^{rd}$ iteration:

$covX_{(3,2)} = covX_{(2,2)} + x_{m+2+4}x_{m+2+4-2} - x_{m+2+2}x_{m+2} + \bar{x}_3(\sum_{m+2}^{m+2+2} x_i + \sum_{5+2-2}^{5} x_i - 2 \times \bar{x}_3) -$
$\bar{x}_2(\sum_{m+3}^{m+1+2} x_i + \sum_{m+2+4-2}^{m+2+4} x_i - 2 \times \bar{x}_2) = 11.875 + 2 \times 1 - 1 \times 3 + 4.5(3 + 6 + 1 + 9 - 2 \times$
$4.5) - 4.75(2 + 6 + 1 + 9 - 2 \times 4.75) = 15.5$ Operations in this step: 6 multiplications, 8 additions, 4 subtractions 5. Use equation 440 to calculate the autocorrelation $\rho_{(3,1)}$ and $\rho_{(3,2)}$ respectively for the 3$^{rd}$ iteration:

$$\rho_{(3,1)} = \frac{covX_{(3,1)}}{SX_3} = \frac{-32.25}{41} = -0.7865853658536585$$

$$\rho_{(3,2)} = \frac{covX_{(3,2)}}{SX_3} = \frac{15.5}{41} = 0.3780487804878049$$

Operations in this step: 2 divisions

There are a total of 3 divisions, 13 multiplications, 18 additions and 11 subtractions when calculating the autocorrelation at lag $l = 1$ and lag $l = 2$ respectively on a moving computation window of length 4.

Fig. 5C Cont'd 2

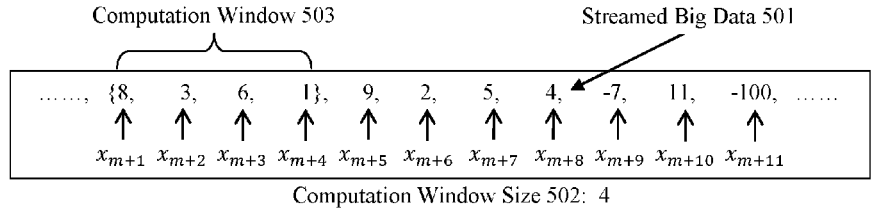

Computation Window Size 502: 4

Calculate Autocorrelation at lag 1 and lag 2 Respectively for Computation Window 503

Iterative Algorithm 3:

1. Use equation 402 to calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 448 to calculate $SX_1$ for the 1st iteration:

$$SX_1 = \sum_{m+1}^{m+4}(x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

3. Use equation 451 to calculate $covX_{(1,1)}$ for the 1st iteration:

$$covX_{(1,1)} = \sum_{m+1+1}^{m+4}(x_i - \bar{x}_1)(x_{i-1} - \bar{x}_1) = (3 - 4.5)(8 - 4.5) + (6 - 4.5)(3 - 4.5) + (1 - 4.5)(6 - 4.5) = (-1.5)(3.5) + (1.5)(-1.5) + (-3.5)(1.5) = -5.25 - 2.25 - 5.25 = -12.75$$

Operations in this step: 3 multiplications, 2 additions, 6 subtractions

4. Use equation 451 to calculate $covX_{(1,2)}$ for the 1st iteration:

$$covX_{(1,2)} = \sum_{m+2+1}^{m+4}(x_i - \bar{x}_1)(x_{i-2} - \bar{x}_1) = (6 - 4.5)(8 - 4.5) + (1 - 4.5)(3 - 4.5) = 10.5$$

Operations in this step: 2 multiplications, 1 addition, 4 subtractions

5. Use equation 454 to calculate the autocorrelation $\rho_{(1,1)}$ and $\rho_{(1,2)}$ respectively for the 1st iteration:

$$\rho_{(1,1)} = \frac{covX_{(1,1)}}{SX_1} = \frac{-12.75}{29} = -0.4396551724137931$$

$$\rho_{(1,2)} = \frac{covX_{(1,2)}}{SX_1} = \frac{10.5}{29} = 0.3620689655172414$$

Operations in this step: 2 divisions

There are a total of 3 divisions, 9 multiplications, 9 additions and 14 subtractions when calculating the autocorrelation at lag $l = 1$ and lag $l = 2$ respectively for a computation window of size 4.

Fig. 5D

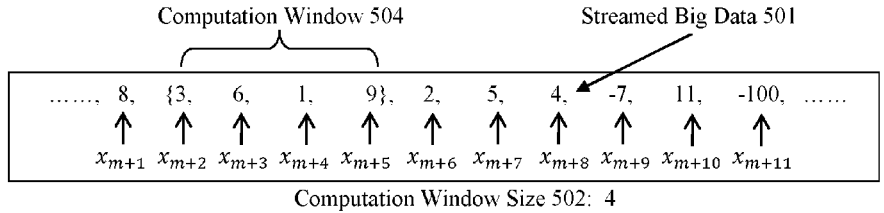

Computation Window Size 502: 4

Calculate Autocorrelation at lag 1 and lag 2 Respectively for Computation Window 504

Iterative Algorithm 3:

1. Use equation 411 to iteratively calculate $\bar{x}_2$ for the 2nd iteration:

$$\bar{x}_2 = \bar{x}_1 + \frac{(x_{m+1+4} - x_{m+1})}{4} = 4.5 + \frac{(9-8)}{4} = 4.5 + \frac{1}{4} = 4.75$$

Operations in this step: 1 division, 1 addition, 1 subtraction

2. Use equation 450 to iteratively calculate $SX_2$ for the 2nd iteration:

$$SX_2 = SX_1 + (x_{m+1+4} - x_{m+1})\big((x_{m+1+4} + x_{m+1}) - (\bar{x}_1 + \bar{x}_2)\big)$$
$$= 29 + (9 - 8)\big((9 + 8) - (4.5 + 4.75)\big) = 36.75$$

Operations in this step: 1 multiplication, 3 additions, 2 subtractions

3. Use equation 453 to iteratively calculate $covX_{(2,1)}$ for the 2nd iteration:

$$covX_{(2,1)} = covX_{(1,1)} + x_{m+1+4-1}(x_{m+1+4} - \bar{x}_1) + x_{m+1+1}(\bar{x}_2 - x_{m+1}) + x_{m+1}\bar{x}_2 - x_{m+1+4}\bar{x}_1 +$$
$$(\bar{x}_2 - \bar{x}_1)\left(\sum_{m+2}^{m+1} x_i + \sum_{m+4+2-1}^{m+4} x_i - 1(\bar{x}_1 + \bar{x}_2)\right) = -12.75 + 1(9 - 4.5) + 3(4.75 - 8) + 8 \times$$
$$4.75 - 9 \times 4.5 - (4.75 - 4.5)(4.5 + 4.75) = -22.8125$$

Operations in this step: 6 multiplications, 5 additions, 5 subtractions

4. Use equation 453 to iteratively calculate $covX_{(5,2)}$ for the 2nd iteration:

$$covX_{(2,2)} = covX_{(1,2)} + x_{m+1+4-2}(x_{m+1+4} - \bar{x}_1) + x_{m+2+1}(\bar{x}_2 - x_{m+1}) + x_{m+1}\bar{x}_2 - x_{m+1+4}\bar{x}_1 +$$
$$(\bar{x}_2 - \bar{x}_1)\left(\sum_{m+2}^{m+2} x_i + \sum_{m+4+2-2}^{m+4} x_i - 2(\bar{x}_1 + \bar{x}_2)\right) = 10.5 + 6(9 - 4.5) + 6(4.75 - 8) + 8 \times 4.75 -$$
$$9 \times 4.5 + (4.75 - 4.5)(3 + 1 - 2(4.5 + 4.75)) = 11.875$$

Operations in this step: 6 multiplications, 6 additions, 5 subtractions

5. Use equation 454 to calculate the autocorrelation $\rho_{(2,1)}$ and $\rho_{(2,2)}$ respectively for the 2nd iteration:

$$\rho_{(2,1)} = \frac{covX_{(2,1)}}{SX_2} = \frac{-22.8125}{36.75} = -0.6207482993197279$$

$$\rho_{(2,2)} = \frac{covX_{(2,2)}}{SX_2} = \frac{11.875}{36.75} = 0.3231292517006803$$

Operations in this step: 2 divisions

There are a total of 3 divisions, 13 multiplications, 15 additions and 13 subtractions when calculating the autocorrelation at lag $l = 1$ and lag $l = 2$ respectively for a computation window of size 4.

Fig. 5D Cont'd 1

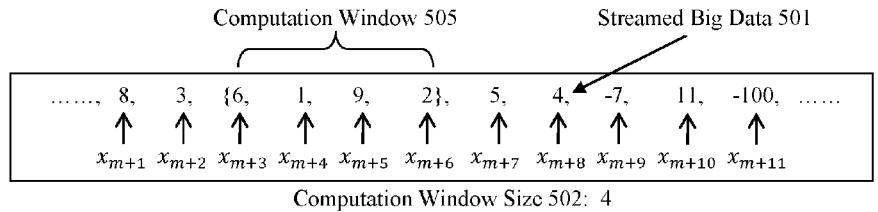

Computation Window Size 502: 4

Calculate Autocorrelation at lag 1 and lag 2 Respectively for Computation Window 505

Iterative Algorithm 3:

1. Use equation 411 to iteratively calculate $\bar{x}_3$ for the 3$^{rd}$ iteration:

$$\bar{x}_3 = \bar{x}_2 + \frac{(x_{m+2+4} - x_{m+2})}{4} = 4.75 + \frac{(2-3)}{4} = 4.75 + \frac{-1}{4} = 4.5$$

Operations in this step: 1 division, 1 addition, 1 subtraction

2. Use equation 450 to iteratively calculate $SX_3$ for the 3$^{rd}$ iteration:

$$SX_3 = SX_2 + (x_{m+2+4} - x_{m+2})((x_{m+2+4} + x_{m+2}) - (\bar{x}_2 + \bar{x}_3))$$
$$= 36.75 + (2 - 3)((2 + 3) - (4.75 + 4.5)) = 41$$

Operations in this step: 1 multiplication, 3 additions, 2 subtractions

3. Use equation 453 to iteratively calculate $covX_{(3,1)}$ for the 3$^{rd}$ iteration:

$$covX_{(3,1)} = covX_{(2,1)} + x_{m+2+4-1}(x_{m+2+4} - \bar{x}_2) + x_{m+2+1}(\bar{x}_3 - x_{m+2}) + x_{m+2}\bar{x}_3 - x_{m+2+4}\bar{x}_2 +$$
$$(\bar{x}_3 - \bar{x}_2)\left(\sum_{m+3}^{m+2} x_i + \sum_{m+3+4-1}^{m+1+4} x_i - 1(\bar{x}_2 + \bar{x}_3)\right) = -22.8125 + 9(2 - 4.75) + 6(4.5 - 3) + 3 \times$$
$$4.5 - 2 \times 4.75 + (4.5 - 4.75)(-(4.75 + 4.5)) = -32.25$$

Operations in this step: 6 multiplications, 5 additions, 5 subtractions

4. Use equation 453 to iteratively calculate $covX_{(3,2)}$ for the 3$^{rd}$ iteration:

$$covX_{(3,2)} = covX_{(2,2)} + x_{m+2+4-2}(x_{m+2+4} - \bar{x}_2) + x_{m+2+2}(\bar{x}_3 - x_{m+2}) + x_{m+2}\bar{x}_3 - x_{m+2+4}\bar{x}_2 +$$
$$(\bar{x}_3 - \bar{x}_2)\left(\sum_{m+3}^{m+3} x_i + \sum_{m+3+4-2}^{m+1+4} x_i - 2(\bar{x}_2 + \bar{x}_3)\right) = 11.875 + 1(2 - 4.75) + 1(4.5 - 3) + 3 \times$$
$$4.5 - 2 \times 4.75 + (4.5 - 4.75)(6 + 9 - 2(4.75 + 4.5)) = 15.5$$

Operations in this step: 6 multiplications, 6 additions, 5 subtractions

5. Use equation 454 to calculate the autocorrelation $\rho_{(3,1)}$ and $\rho_{(3,2)}$ respectively for the 3$^{rd}$ iteration:

$$\rho_{(3,1)} = \frac{covX_{(3,1)}}{SX_3} = \frac{-32.25}{41} = -0.7865853658536585$$

$$\rho_{(3,2)} = \frac{covX_{(3,2)}}{SX_3} = \frac{15.5}{41} = 0.3780487804878049$$

Operations in this step: 2 divisions

There are a total of 3 divisions, 13 multiplications, 15 additions and 13 subtractions when calculating the autocorrelation at lag $l = 1$ and lag $l = 2$ respectively for a computation window of size 4.

|  | Division | Multiplication | Addition | Subtraction |
|---|---|---|---|---|
| Traditional Algorithm | 3 | 9 | 9 | 14 |
| Iterative Algorithm 1 | 3 | 16 | 16 | 11 |
| Iterative Algorithm 2 | 3 | 13 | 18 | 11 |
| Iterative Algorithm 3 | 3 | 13 | 15 | 13 |

(n = 4, maxl = 2)

Fig. 6

|  | Division | Multiplication | Addition | Subtraction |
|---|---|---|---|---|
| Traditional Algorithm | 3 | 2,999,997 | 3,999,993 | 4,999,994 |
| Iterative Algorithm 1 | 3 | 16 | 16 | 11 |
| Iterative Algorithm 2 | 3 | 13 | 18 | 11 |
| Iterative Algorithm 3 | 3 | 13 | 15 | 13 |

(n = 1,000,000, maxl = 2)

Fig. 7

ITERATIVE AUTOCORRELATION FUNCTION CALCULATION FOR BIG DATA USING COMPONENTS

CROSS-REFERENCE TO RELATED APPLICATIONS

This application claims the benefit of provisional patent application Ser. No. 62/089,230, filed 2014 Dec. 9 by the present inventor.

BACKGROUND AND RELEVANT ART

Internet, mobile communications, navigation, online gaming, sensing technologies and large scale computing infrastructures are producing large amounts of data sets every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Processing Big Data may include performing calculations on multiple data elements. When performing statistical calculations on Big Data, the number of data elements to be accessed may be quite large. For example, when calculating an autocorrelation a (potentially large) number of data elements may need to be accessed.

Further, some statistical calculations are recalculated after some data changes in a Big Data set. Thus, the (potentially large) number of data elements may be repeatedly accessed. For example, it may be that an autocorrelation function is calculated for a computation window that includes the last n data elements added to a Big Data set that is stored in storage media. As such, every time two data elements are accessed or received, one of the accessed or received elements is added to the computation window and the other data element is removed from the computation window. The n data elements in the computation window are then accessed to recalculate the autocorrelation function.

As such, each data change in the computation window may only change a small portion of the computation window. Using all data elements in the computation window to recalculate the autocorrelation function involves redundant data access and computation, and thus is time consuming and is an inefficient use of resources.

Depending on necessity, the computation window size n may be extremely large, so the data elements in a computation window may be distributed over a cloud comprising hundreds of thousands of computing devices. Re-performing an autocorrelation function calculation in traditional ways on Big Data after some data changes inefficiently uses time and computing resources.

BRIEF SUMMARY

The present disclosure describes methods, systems, and computing system program products for iteratively calculating autocorrelation function for Big Data. A system comprising computing devices includes one or more storage media that have stored a Big Data set. A computation window size indicates a specified number n (n>1) of data elements in a computation window. The computation window, a subset of the Big Data set, contains the data elements involved in an autocorrelation function calculation. A specified upper lag limit maxl or a specified pair (minl, maxl) indicates a range of lags to be used for the autocorrelation function calculation. Iteratively calculating an autocorrelation function at a specified range of lags for an adjusted computation window includes iteratively calculating one or more (p(p>1)) components of the autocorrelation function at each respective lag within the specified range of lags for the adjusted computation window based on one or more components of an autocorrelation at the respective lag for a previous computation window and then calculating the autocorrelation at the respective lag as needed using one or more iteratively calculated components at the respective lag. Iteratively calculating autocorrelation function avoids visiting all data elements in the adjusted computation window and performing redundant computations thereby increasing calculation efficiency, saving computing resources and reducing computing system's power consumption.

The computing system initializes one or more ($v(1 \leq v \leq p)$) components of an autocorrelation at each respective lag within the specified range of lags for a computation window of a specified size n (n>1). The initialization of the one or more components at each respective lag comprises calculating the one or more components at the respective lag through their definitions based on the data elements in the computation window or accessing or receiving pre-calculated one or more components at each respective lag within the specified range of lags from one or more computing-device-readable media.

The computing system accesses or receives a data element to be removed from the computation window and a data element to be added to the computation window.

The computing system adjusts the computation window by removing the to-be-removed data element from the computation window and adding the to-be-added data element to the computation window.

The computing system directly iteratively calculates one or more $v(1 \leq v \leq p)$ components of an autocorrelation at each respective lag within the specified range of lags for the adjusted computation window and stores the calculated v components at each respective lag (e.g., into an array in memory or a file on disks). The computing system directly iteratively calculates v components of an autocorrelation at each respective lag within the specified range of lags for a given computation window through a loop: setting an initial value for a lag, iteratively calculating v components of the autocorrelation at the lag, storing the calculated v components, adjusting the lag to a new value within the specified range of lags, calculating v components at the lag, storing the calculated v components, adjusting the lag again, calculating v components at the lag again, storing the calculated v components again, . . . , repeating this process until v components at all different lag values within the specified range of lags have been calculated and stored. Directly iteratively calculating $v(1 \leq v \leq p)$ components at a given lag includes: accessing l data elements next to the removed data element in the computation window and l data elements next to the added data element in the computation window and accessing the v components at the given lag calculated for the previous computation window; removing any contribution of the removed data element from each of the v components at the given lag mathematically; and adding a contribution of the added data element to each of the v components at the given lag mathematically.

The computing system indirectly iteratively calculates w=p−v components of an autocorrelation at each respective lag within the specified range of lags for the adjusted computation window as needed. The computing system indirectly iteratively calculates w components of an autocorrelation at each respective lag within the specified range of lags for a given computation window through a loop: setting an initial value for a lag, iteratively calculating w components of the autocorrelation at the lag, adjusting the lag to a new value within the specified range of lags, calculating w components at the lag, adjusting the lag again, calculating w components at the lag again, . . . , repeating this process until w components at all different lag values within the specified range of lags have been calculated. Indirectly iteratively calculating w components at a given lag includes indirectly iteratively calculating each of the w components at the given lag one by one. Indirectly iteratively calculating a component at the given lag includes: accessing one or more components at the given lag and calculating the component at the given lag by using one or more components at the given lag other than the component itself. The one or more components at the given lag may have been initialized, directly iteratively calculated or indirectly iteratively calculated.

The computing system initializes a lag, and calculates an autocorrelation at the given lag for a given computation window as needed by using one or more iteratively calculated components of an autocorrelation at the given lag for the given computation window. The computing system adjusts the lag to a new value within the specified range (from 1 to maxl or minl to maxl), then generates an autocorrelation at the given lag for a given computation window as needed by using one or more iteratively calculated components of an autocorrelation at the given lag for the given computation window. The computing system repeats this process until autocorrelation function at all lags within a specified range having been calculated. When w>0, the loop for indirectly calculating w components and the loop for generating autocorrelation function may be combined into a single loop.

The computing system may keep accessing or receiving a data element to be removed and a data element to be added, adjusting the computation window, directly iteratively calculating $v(1 \leq v \leq p)$ components at each respective lag within the specified range of lags and storing the calculated components, indirectly iteratively calculating w=p−v components at each respective lag within the specified range of lags as needed and generating an autocorrelation at each respective lag within the specified range of lags as needed, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of an autocorrelation and traditional equations for calculating an autocorrelation.

FIG. 4B illustrates some example components of an autocorrelation and basic iterative component calculation equations.

FIG. 4C illustrates the equations of the first example iterative autocorrelation calculation algorithm (iterative algorithm 1).

FIG. 4D illustrates the equations of the second example iterative autocorrelation calculation algorithm (iterative algorithm 2).

FIG. 4E illustrates the equations of the third example iterative autocorrelation calculation algorithm (iterative algorithm 3).

FIG. 5A illustrates an example of calculating autocorrelation using traditional algorithms as shown in FIG. 4A.

FIG. 5B illustrates an example of calculating autocorrelation using iterative algorithm 1 as shown in FIG. 4C.

FIG. 5C illustrates an example of calculating autocorrelation using iterative algorithm 2 as shown in FIG. 4D.

FIG. 5D illustrates an example of calculating autocorrelation using iterative algorithm 3 as shown in FIG. 4E.

FIG. 6 illustrates computational loads for traditional autocorrelation function algorithms and iterative autocorrelation function algorithms when n=4, maxl=2.

FIG. 7 illustrates computational loads for traditional autocorrelation function algorithms and iterative autocorrelation function algorithms when n=1,000,000, maxl=2.

DETAILED DESCRIPTION

Figure 1:
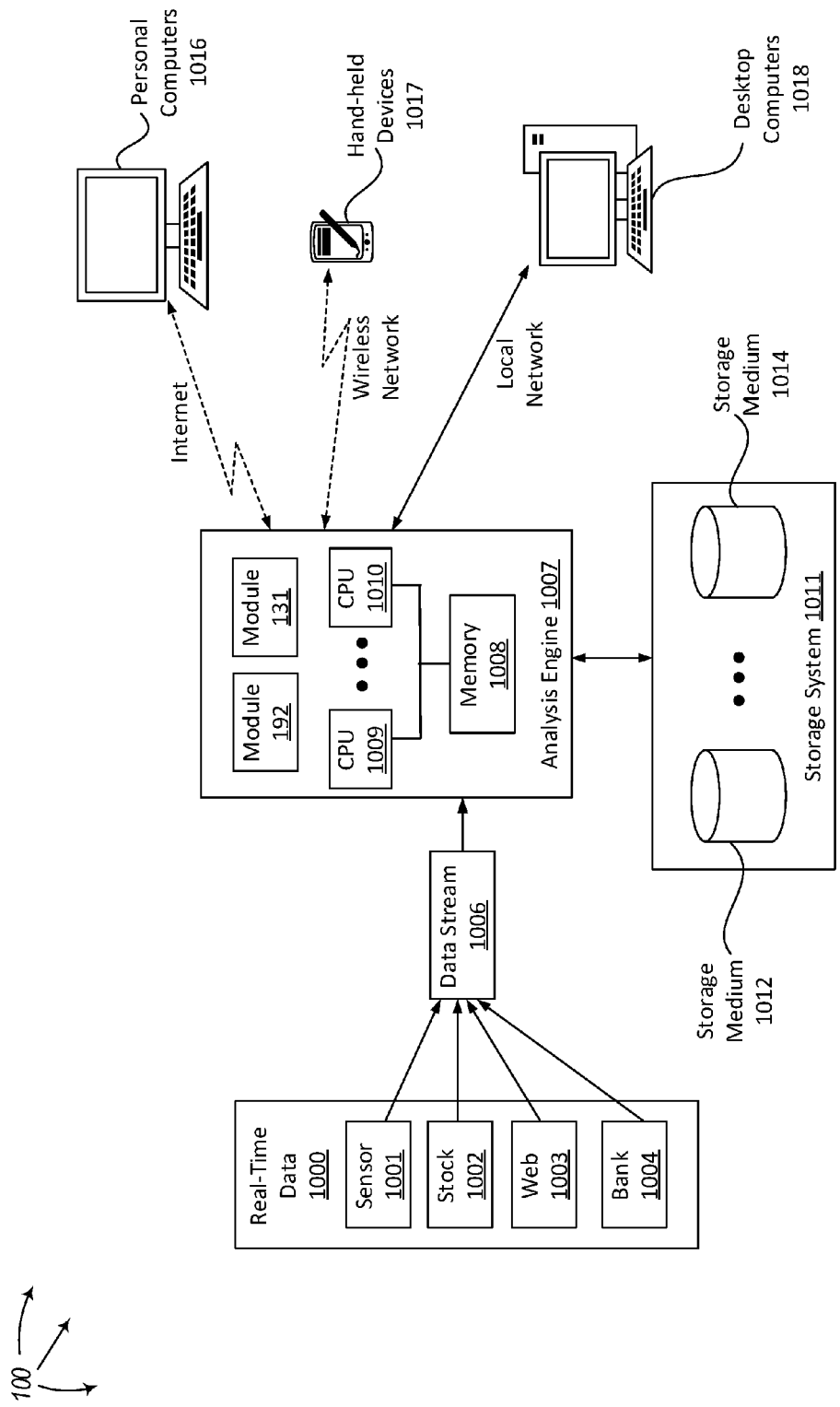
FIG. 1 illustrates a high-level overview of an example computing system that facilitates iteratively calculating autocorrelation function for Big Data.

The present disclosure describes methods, systems, and computing system program products for iteratively calculating an autocorrelation function for Big Data. A system comprising computing devices includes one or more storage media that have stored a Big Data set. A computation window size indicates a specified number n (n>1) of data elements in a computation window. The computation window, a subset of the Big Data set, contains the data elements involved in an autocorrelation function calculation. A specified upper lag limit maxl or a specified pair (minl, maxl) indicates a range of lags to be used for the autocorrelation function calculation. Iteratively calculating an autocorrelation function at a specified range of lags for an adjusted computation window includes iteratively calculating one or more ($p(p \geq 1)$) components of an autocorrelation at each respective lag within the specified range of lags for the adjusted computation window based on one or more components of an autocorrelation at the respective lag for a previous computation window and then calculating the autocorrelation at the respective lag as needed using one or more iteratively calculated components at the respective lag. Iteratively calculating autocorrelation function avoids visiting all data elements in the adjusted computation window and performing redundant computations thereby increasing calculation efficiency, saving computing resources and reducing computing system's power consumption.

An autocorrelation is a measure of the correlation of a particular time series with the same time series delayed by l lags. It is also called "lagged correlation" or "serial correlation". It is obtained by dividing the covariance between two observations, separated by l lags, of a time series by the standard deviation. If the autocorrelation is calculated for all values of l we obtain the autocorrelation function. For a time series that does not change over time, the autocorrelation function decreases exponentially to 0. The value of an autocorrelation is between −1 and +1. A value of 1 indicates there is a perfect positive linear relationship between the time series' past and future values. A value of −1 indicates there is an exact negative linear relationship between the time series' past and future values.

As used herein, a Big Data set includes multiple data elements that have certain orders and have been stored in one or more computing-device-readable storage media. The difference between processing Big Data and live data stream is that when processing Big Data, all historical data elements are accessible, and thus it might not be necessary to create a buffer to store newly received data elements.

As used herein, a computation window is a moving window on a Big Data set which includes the data elements involved in an autocorrelation function calculation. The computation window may move to either right or left direction. For example, when processing data elements newly added to the Big Data set, the computation window moves to the right. In this case, a data element is added to the right side of the computation window and a data element is removed from the left side of the computation window. When recalculating an autocorrelation function on data elements previously added to the Big Data set, the computation window moves to the left side. In this case, a data element is added to the left side of the computation window and a data element is removed from the right side of the computation window. The goal is to iteratively calculate autocorrelation function at a specified range of lags (between 1 and maxl or minl and maxl) for the computation window whenever the computation window moves to either right or left by one or more data elements. Both cases may be handled in the same way but just the equations for iterative autocorrelation function calculation are different. By way of example, and not limitation, embodiments of the invention are described and explained using the first case (computation window moving to the right) as an example in the following descriptions.

A lag range may be specified in two ways: specifying a single upper lag limit maxl, and in this case all values between 1 and maxl will be used as lags (i.e., $1 \leq l \leq maxl$); specifying a lower lag limit minl and an upper lag limit maxl, and in this case all values between minl and maxl will be used as lags (i.e., $minl \leq l \leq maxl$). By way of example, and not limitation, embodiments of the invention are described and explained using a single upper lag limit maxl (i.e., $1 \leq l \leq maxl$) as an example in the following descriptions. The other case may be handled in a similar way.

As used herein, a component of an autocorrelation is a quantity or expression appearing in the autocorrelation's definition equation or any transforms of the equation. An autocorrelation is the largest component of an autocorrelation itself. An autocorrelation at a given lag may be calculated using one or more ($p(p \geq 1)$) components of the autocorrelation at the given lag. Some example components of an autocorrelation may be found in FIG. 4B.

A component may be either directly iteratively calculated or indirectly iteratively calculated. The difference between them is that when directly iteratively calculating a component the component is calculated by using the component's value in previous iteration but when indirectly iteratively calculating a component the component is calculated by using components other than the component itself.

For a given component, it might be directly iteratively calculated in one algorithm but indirectly iteratively calculated in another algorithm.

For a given algorithm, assume the total number of different components is $p(p \geq 1)$, the number of directly iteratively calculated components is $v(1 \leq v \leq p)$, then the number of indirectly iteratively calculated components is $w=p-v$ ($0 \leq w < p$). For any algorithm, there will be at least one component being directly iteratively calculated. It is possible that all components are directly iteratively calculated (in this case v=p and w=0). However, directly iteratively calculated components must be calculated in every iteration no matter if an autocorrelation function is accessed or not in a specific iteration.

For a given algorithm, if a component is directly iteratively calculated, then the component must be calculated in every iteration (i.e., whenever an existing data element is removed from and a data element is added to the computation window). However, if a component is indirectly iteratively calculated, then the component may be calculated as needed using one or more components other than the component itself, i.e., only when an autocorrelation function needs to be calculated and accessed. Thus, when an autocorrelation function is not accessed in a specific iteration, only a small number of components need to be iteratively calculated. It should be understood that an indirectly iteratively calculated component may also be used in the calculation of a directly iteratively calculated component. In that case, the indirectly iteratively calculated component should also be calculated in every iteration.

Lag l is initialized with a value of 1 or the upper lag limit maxl. The computing system calculates one or more ($p(p \geq 1)$) components of an autocorrelation at a given lag less than the upper lag limit for the computation window. The computing system stores the one or more ($p(p \geq 1)$) components at a given lag. The computing system updates the lag and then repeats the above calculation until one or more ($p(p \geq 1)$) components of an autocorrelation at all lags between 1 and the upper lag limit maxl are calculated and stored.

Embodiments of the invention include iteratively calculating one or more ($p(p \geq 1)$) components of an autocorrelation at each respective lag within a specified range of lags for an adjusted computation window based on one or more ($p(p \geq 1)$) components of an autocorrelation at the respective lag calculated for a previous computation window.

The computing system initializes one or more ($v$ ($1 \leq v \leq p$)) components of an autocorrelation at each respective lag within the specified range of lags for a computation window of a specified size n ($n > 1$). The initialization of the one or more components at each respective lag comprises calculating the one or more components at the respective lag through their definitions based on the data elements in the computation window or accessing or receiving pre-calculated one or more components at each respective lag within the specified range of lags from one or more computing-device-readable media.

The computing system accesses or receives a data element to be removed from the computation window and a data element to be added to the computation window.

The computing system adjusts the computation window by: removing the to-be-removed data element from the computation window and adding the to-be-added data element to the computation window. The computing system resets the lag to an initial value within the specified range of lags whenever a to-be-removed data element and a to-be-added data element are accessed or received.

The computing system directly iteratively calculates one or more $v(1 \leq v \leq p)$ components of an autocorrelation at each respective lag within a specified range of lags respectively for the adjusted computation window and stores the calculated v components at the respective lag (e.g., into an array in memory or a file on disks). The computing system directly iteratively calculates v components of an autocorrelation at each respective lag within a specified range of lags for a given computation window through a loop: setting an initial value for a lag l, directly iteratively calculating v components of the autocorrelation at the lag, storing the calculated v components, adjusting the lag to a new value within the specified range of lags, directly iteratively calculating v components at the lag, storing the calculated v components, adjusting the lag again, directly iteratively calculating v components at the lag again, storing the calculated v components again, . . . , repeating this process until v components at all different lag values within the specified range have been directly iteratively calculated and stored. Directly iteratively calculating $v(1 \leq v \leq p)$ components at a given lag l includes: accessing l data elements next to the removed data element in the computation window and l data elements next to the added data element in the computation window and accessing the v components at the given lag l calculated for the previous computation window; removing any contribution of the data element removed from the computation window from each of the v components at the given lag l mathematically; and adding a contribution of the new data element to each of the v components at the given lag l mathematically.

The computing system indirectly iteratively calculates $w=p-v$ components of an autocorrelation at each respective lag within a specified range of lags for the adjusted computation window as needed. The computing system indirectly iteratively calculates w components of an autocorrelation at each respective lag within a specified range of lags for a given computation window through a loop: setting an initial value for a lag l, iteratively calculating w components of the autocorrelation at the lag, adjusting the lag to a new value within the specified range of lags, calculating w components at the lag, adjusting the lag again, calculating w components at the lag again, . . . , repeating this process until w components at all different lag values within the specified range of lags have been calculated. Indirectly iteratively calculating w components at a given lag l includes indirectly iteratively calculating each of the w components at the given lag l one by one. Indirectly iteratively calculating a component at the given lag l includes: accessing one or more components at the given lag l and calculating the component at the given lag by using the one or more components at the given lag other than the component itself (Depending on a specific algorithm used, calculating each of the w components may also need to access and use the removed data element and/or the added data element). The one or more components at the given lag may have been initialized, directly iteratively calculated or indirectly iteratively calculated.

The computing system initializes a lag l, and calculates an autocorrelation at the given lag for a given computation window as needed by using one or more iteratively calculated components of an autocorrelation at the given lag for the given computation window. The computing system adjusts the lag to a new value within a specified range (from 1 to maxl) of lags, then calculates an autocorrelation at the given lag for a given computation window as needed by using one or more iteratively calculated components of an autocorrelation at the given lag for the given computation window. The computing system may repeat this process until autocorrelation function at all lags within a specified range of lags having been calculated. When $w>0$, the loop for indirectly calculating w components and the loop for calculating autocorrelation function may be combined into a single loop.

The computing system may keep accessing or receiving a data element to be removed and a data element to be added, adjusting the computation window, directly iteratively calculating $v(1 \leq v \leq p)$ components at each respective lag within the specified range of lags and storing the calculated components, indirectly iteratively calculating $w=p-v$ components at each respective lag within the specified range of lags as needed and generating an autocorrelation at each respective lag within the specified range of lags as needed, and the computing system may repeat this process for as many times as needed.

Embodiments of the present invention may comprise or utilize a special purpose or general-purpose computing system including computing device hardware, such as, for example, one or more processors and one or more storage media, as discussed in greater detail below. Embodiments within the scope of the present invention also include physical and other computing-system-readable media for carrying or storing computing-system-executable instructions and/or data structures. Such computing-device-readable media may be any available media that may be accessed by a general purpose or special purpose computing device. Computing-system-readable media that store computing-system-executable instructions are computing device storage media (devices). Computing-system-readable media that carry computing-system-executable instructions are transmission media. Thus, by way of example, and not limitation, embodiments of the invention may comprise at least two distinctly different kinds of computing-system-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-system-executable instructions comprise, for example, instructions and data which, when executed at a processor, cause a general purpose computing system or special purpose computing system to perform a certain function or group of functions. The computing system executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

Several examples will be given in the following sections.

FIG. 1 illustrates a high-level overview of an example computing system 100 that facilitates iteratively calculating autocorrelation for Big Data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, and component calculation modules 192 and 131. Component calculation modules 192 and 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
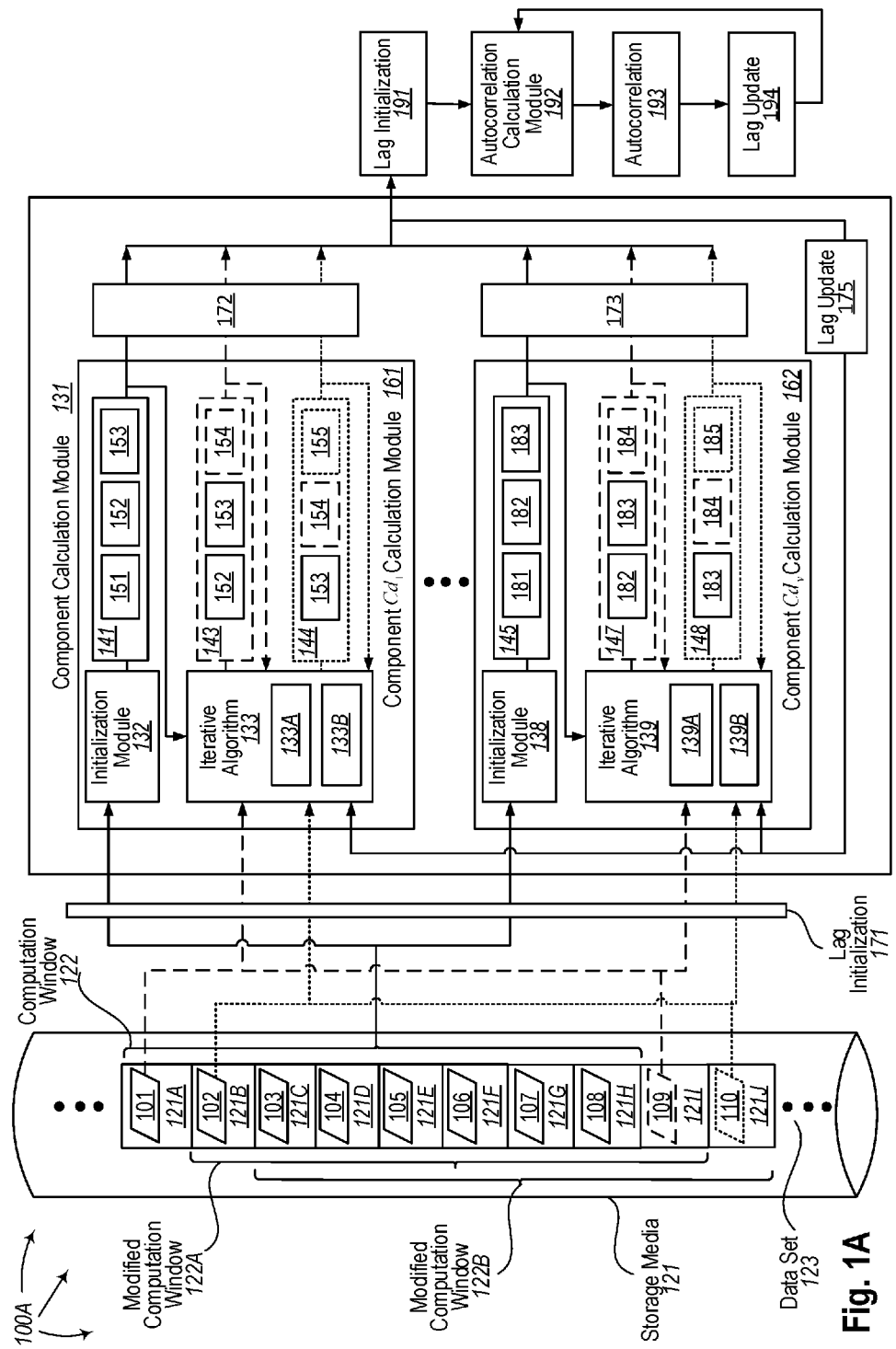
FIG. 1A illustrates an example computing device architecture that facilitates iteratively calculating autocorrelation function for Big Data with all components being directly iteratively calculated.

FIG. 1A illustrates an example computing device architecture 100A that facilitates iteratively calculating autocorrelation for Big Data with all components ($v=p\geq 1$) being directly iteratively calculated. FIG. 1A illustrates 1007 and 1006 shown in FIG. 1. Referring to FIG. 1A, computing device architecture 100A includes component calculation module 131 and autocorrelation calculation module 192. Component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. Accordingly, component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of autocorrelation calculation module 192, and autocorrelation calculation module 192 will generate autocorrelation 193.

In general, storage media 121 may be a single local storage medium and may also be a complex storage system that comprises multiple physically distributed storage devices managed by a storage management system.

Storage media 121 comprises a data set 123. In general, data set 123 may comprise different kinds of data, such as, for example, stock quotes, audio data, video data, geospatial data, web data, mobile communication data, online gaming data, banking transaction data, sensor data, and closed-captioning data, real time text, etc.

As depicted, data set 123 comprises multiple data elements stored in multiple locations of storage media 121. For example, data elements 101 is stored in location 121A, data element 102 is stored in location 121B, data element 103 is stored in location 121C, data element 104 is stored in location 121D, data element 105 is stored in location 121E, data element 106 is stored in location 121F, data element 107 is stored in location 121G, data element 108 is stored in location 121H, data element 109 is stored in location 121I, and data element 110 is stored in location 121J, etc., . . . . There are multiple data elements stored in other locations.

Assume that an autocorrelation function calculation is started from computation window 122. Computation window 122 with a specified size of 8 (i.e., n=8) contains a portion of data set 123: data elements 101, 102, . . . , and 108. All the data elements ranging from 101 to 108 in computation window 122 may be accessed or received for initializing one or more components of the autocorrelation function.

Next, data elements 101 and 109 may be accessed or received from locations 121A and 121I respectively. Data element 101 will be removed from computation window 122, and data element 109 will be added to computation window 122, then computation window 122 transits to computation window 122A. Computation window 122A contains 8 data elements: 102, 103, . . . , 109. The computing system may iteratively calculate an autocorrelation function for computation window 122A.

Subsequently, data elements 102 and 110 may be accessed or received from locations 121B and 121I respectively. Data element 102 will be removed from computation window 122A, and data element 110 will be added to computation window 122A, then computation window 122A transits to computation window 122B. Computation window 122B contains 8 data elements: 103, 103, . . . , 110. The computing system may iteratively calculate an autocorrelation function for computation window 122B.

More details about the example computing system architecture are provided below.

As depicted in FIG. 1A, lag initialization module 171 sets an initial value of lag whenever a data element to be removed from the computation window and a data element to be added to the computation window are accessed or received. There is also storage space for storing directly iteratively calculated one or more ($v(v=p\geq 1)$) components at different lag values. For example, 172 may be a storage space used for storing iteratively calculated component $Cd_1$ at a range of different lag values. 173 may be a storage space used for storing iteratively calculated component $Cd_v$ at a range of different lag values. Lag update module 175 may update the lag by enumerating the lag within a specified range.

In general, component calculation module 131 comprises one or more ($v(v=p\geq 1)$) component calculation modules for calculating ($v(v=p\geq 1)$) components of autocorrelation for a set of n data elements in a computation window. The number v is the number of components involved in a specific iterative autocorrelation algorithm at a given lag, which varies depending on which iterative algorithm is used. Each component calculation module comprises an initialization module for initializing a component on an initial computation window and an algorithm for directly iteratively calculating the component on adjusted computation windows afterwards. For example, as depicted in FIG. 1A, component calculation module 131 comprises component $Cd_1$ calculation module 161 and component $Cd_v$ calculation module 162, and there are v−2 other component calculation modules between them. Each component calculation module calculates a specific component at a given lag. The lag will be changed within a specified range, e.g., from 1 to a specified upper limit maxl. For example, if maxl=10, then the autocorrelation on the same input data at lag l=1, lag l=2, lag l=3, . . . , lag l=10 will be calculated respectively. The value of maxl may be set as an input to the computing system. Usually, the value of maxl is set to be smaller than ¼ of the computation window size n. At a given lag, v components are calculated, and then the components are stored in a storage space, e.g., component $Cd_1$ is stored in storage space 172 and component $Cd_v$ is stored in storage space 173. The storage space (e.g., 172 and/or 173) may be one or more arrays in memory or one or more files on hard drives. Then, the lag will be updated by lag update module 175, e.g., by increasing or decreasing the lag by 1. Then, the v component calculation modules calculate v components with the new lag value for the same computation window again, and then the calculated v components will be stored in the storage space. This process may be repeated until v components at a range of lags have been calculated. Theoretically, at each given lag l, v components need to be calculated, so for lags ranging from 1 to maxl, a total of less than v*maxl component values need to be calculated and stored. However, in fact, only those components whose calculation directly related to lag need to be recalculated for each value of different lags, and thus the number of components calculated by component calculation module 131 is indeed less than v*maxl. For example, a sum or a mean of the data elements in a computation window is a component to be used by all iterative autocorrelation algorithms, but its value is not related to a lag and thus it is not changing at different lags for the same computation window, so it is not necessary to recalculate the sum or mean while the lag is changing. Thus there are no more than v*maxl component values will be calculated by component calculation module 131 for a given computation window. The actual number of component values calculated by component calculation module 131 varies depending on the specific iterative algorithm used. As depicted in FIG. 1A, component calculation module 131 comprises component $Cd_1$ calculation module 161 and component $Cd_v$ calculation module 162. What between them may be component $Cd_2$ calculation module, component $Cd_3$ calculation module, . . . , and component $Cd_{v-1}$ calculation module. Component $Cd_1$ calculation module 161 comprises initialization module 132 for initializing component $Cd_1$ at a given lag and iterative algorithm 133 for directly iteratively calculating component $Cd_1$ at a given lag. Component $Cd_v$ calculation module 162 comprises initialization module 138 for initializing component $Cd_v$ at a given lag and iterative algorithm 139 for directly iteratively calculating component $Cd_v$ at a given lag. Initialization module 132 is configured to initialize component $Cd_1$ at a given lag for a set of n data elements in a computation window and initialization module 138 is configured to initialize component $Cd_v$ at a given lag for a set of n data elements in a computation window. Initialization module 132 and Initialization module 138 access or receive a full set of n data elements (i.e., 8 data elements) from a computation window as input. Initialization module 132 calculates component $Cd_1$ and initialization module 138 calculates component $Cd_v$ from the full set of n data elements at a given lag respectively. Thus, each data element contributes to the calculated components ranging from component $Cd_1$ to component $Cd_v$ at a given lag. Initialization module 132 may be used for an initial component $Cd_1$ calculation or when autocorrelation function calculations are reset. Similarly, initialization module 138 may be used for an initial component $Cd_v$ calculation or when autocorrelation function calculations are reset.

Iterative algorithms are also configured to calculate a total of no more than v*maxl component values for a set of n data elements in a computation window. Iterative algorithm 133 accesses or receives a prior component $Cd_1$ at a given lag, a removed data element and an added data element as input. Iterative algorithm 133 directly iteratively calculates a new component $Cd_1$ at a given lag for an adjusted computation window from the component $Cd_1$ at the given lag for the prior computation window, the removed data element and the added data element. Contribution removal module 133A may remove any contribution of the removed data element from the component $Cd_1$ at the given lag for the prior computation window. Contribution addition module 133B may add a contribution of the added data element to the component $Cd_1$ at the given lag for the prior computation window. Removing any contribution of the removed data element along with adding a contribution of the added data element may be used for calculating component $Cd_1$ at the given lag for the adjusted computation window. Iterative algorithm 139 works in a similar way as iterative algorithm 133. Iterative algorithm 139 accesses or receives a component $Cd_v$ at the given lag for the prior computation window, a removed data element and an added data element as input. Iterative algorithm 139 calculates a new component $Cd_v$ at the given lag for the adjusted computation window from the component $Cd_v$ at the given lag for the prior computation window, the data element removed from the computation window and the data element newly added to the computation window. Contribution removal module 139A may remove any contribution of the removed data element from the prior component $Cd_v$ at the given lag. Contribution addition module 139B may add a contribution of the newly added data element to the prior component $Cd_v$ at the given lag. Removing any contribution of the removed data element along with adding a contribution of the newly added data element may be used for calculating component $Cd_v$ at the given lag for the computation window.

Once p*maxl (p=v≥1) components of an autocorrelation function at all lags within a specified range are calculated and stored by component calculation module 131, the computing device starts another loop to calculate an autocorrelation function as needed. Referring to FIG. 1A, computing device architecture 100A also includes lag initialization module 191, autocorrelation calculation module 192, autocorrelation 193 and lag update module 194. Lag initialization module 191 sets an initial value of lag (e.g., lag l=1 or lag l=upper lag limit maxl). Lag update module 194 updates the lag value to enumerate the lag for a specified range (e.g., l=l+1 or l=l−1). For a given lag, autocorrelation calculation module 192 may calculate the autocorrelation 193 at the given lag using one or more iteratively calculated components at the given lag.

As depicted in FIG. 1A, there are two separate loops to enumerate the lag for a specified range. One loop is used for calculating p (p=v≥1) components at a range of lags, and the other is used for calculating autocorrelations at a range of lags by using one or more components at a range of lags. The advantage of such separated loops is that when it is not necessary to calculate autocorrelation for every data change, the system or program may perform the component calculation loop only, and only when an autocorrelation result is accessed, the loop for calculating autocorrelation with a range of lags will be performed. The disadvantage of such strategy is that it needs extra space to store calculated no more than p*maxl component values. It is completely doable to combine the two loops into one loop. For example, for a given computation window, at a given lag, computing device 100A iteratively calculates p components, then uses one or more iteratively calculated components to calculate an autocorrelation at the given lag, then updates the lag, iteratively calculates p components, uses one or more iteratively calculated components to calculate an autocorrelation at the new lag, and repeats this process until all autocorrelations at a range of lags have been calculated. In this case, 172 and 173 are not needed, but for every data change, autocorrelation will be calculated no matter the autocorrelation will be accessed or not.

Figure 1B:
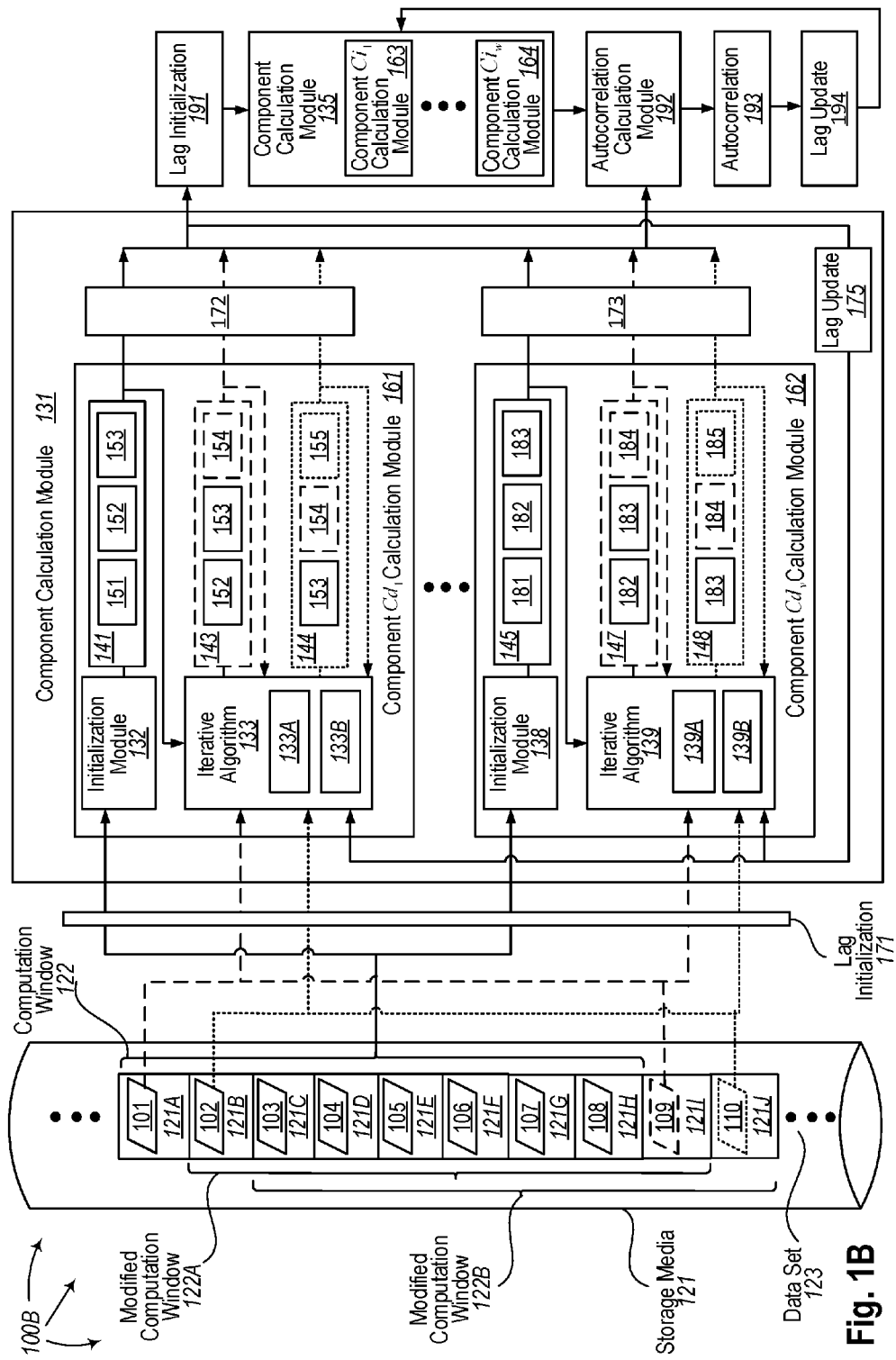
FIG. 1B illustrates an example computing device architecture that facilitates iteratively calculating autocorrelation function for Big Data with some components being directly iteratively calculated and some components being indirectly iteratively calculated.

FIG. 1B illustrates an example computing device architecture 100B that facilitates iteratively calculating an autocorrelation for Big Data with some (v(1≤v<p)) components being directly iteratively calculated and some (w(w=p−v)) components being indirectly iteratively calculated. In certain implementations, the difference between the computing device architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Number v in 100B may not be the same number v as in 100A, because some directly iteratively calculated components in 100A are indirectly iteratively calculated in 100B. In 100A, v=p≥1, but in 100B, 1≤v<p. Referring to FIG. 1B, computing device architecture 100B includes component calculation module 135. The output of components calculation module 131 may be used as the input of component calculation module 135, and the output of calculation modules 131 and 135 may be used as the input of autocorrelation calculation module 192, and autocorrelation calculation module 192 may generate autocorrelation 193. Component calculation module 135 generally includes w=p−v component calculation modules for indirectly iteratively calculating w components. For example, Component calculation module 135 includes calculation module 163 for indirectly iteratively calculating component $Ci_1$ and calculation module 164 for indirectly iteratively calculating component $Ci_w$, and there are w−2 component calculation modules in between. Indirectly iteratively calculating w components includes indirectly iteratively calculating each of the w components one by one. Indirectly iteratively calculating a component includes accessing and using one or more components other than the component itself. The one or more components may have been initialized, directly iteratively calculated or indirectly iteratively calculated.

Figure 2:
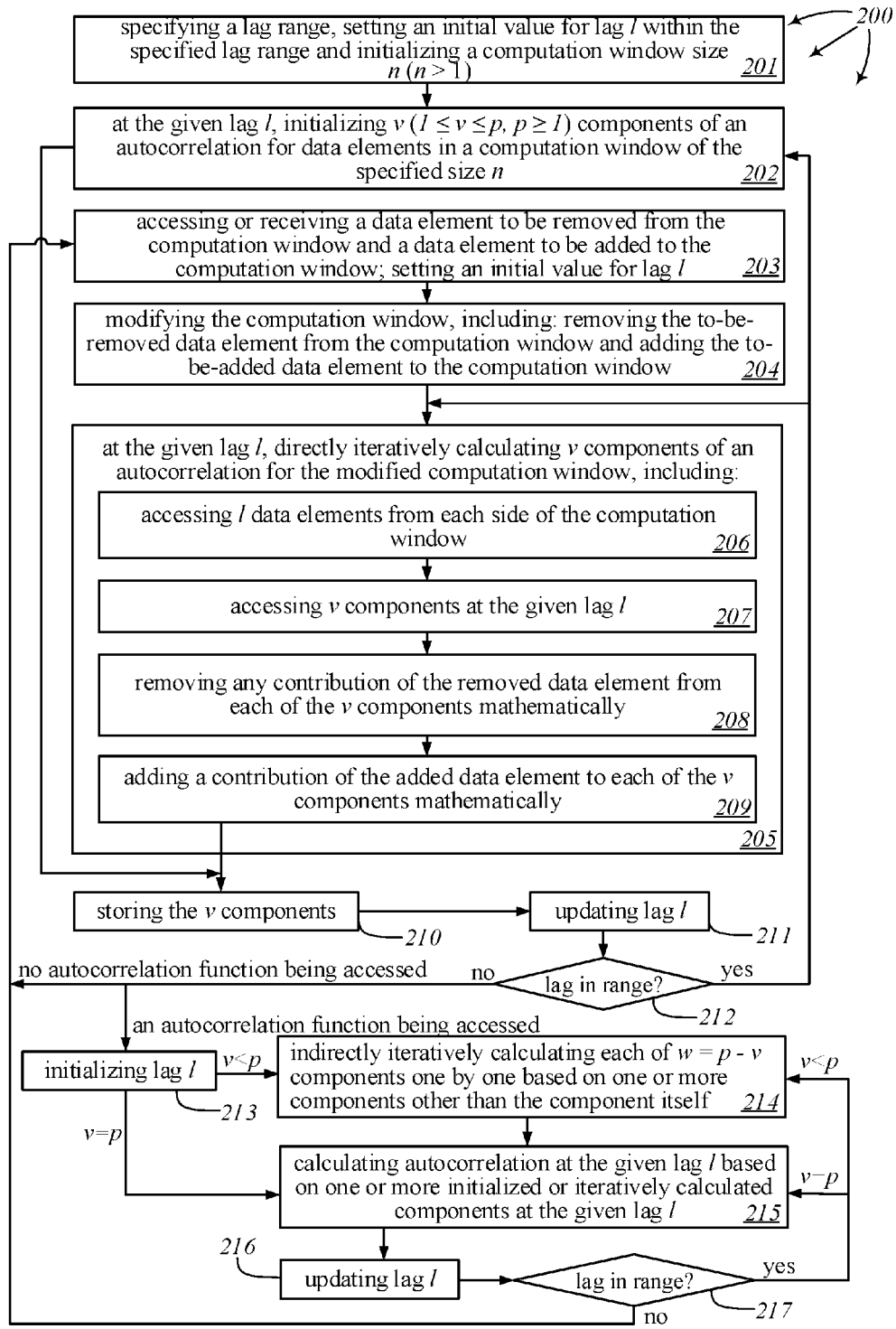
FIG. 2 illustrates a flow chart of an example method for iteratively calculating an autocorrelation function for Big Data.

FIG. 2 illustrates a flow chart of an example method 200 for iteratively calculating autocorrelation for Big Data. Method 200 will be described with respect to the components and data of computing device architectures 100A and 100B.

Method 200 includes specifying a lag range, setting an initial value for lag l within the specified lag range and initializing a computation window size n (201). For example, user may either specify an upper lag limit maxl or specify a lower lag limit minl and an upper lag limit maxl and a computation window size n. For simplicity of description, assume a single upper lag limit maxl is specified in the following descriptions. Referring to computing device architectures 100A and 100B, lag initialization module 171 may initialize lag l with an initial value (e.g., 1 or upper lag limit maxl).

Method 200 includes at the given lag l, initializing or calculating v(1≤v≤p) components of an autocorrelation from the Big Data in a computation window with size n (202). For example, method 200 may calculate v components according to their definitions by accessing and using Big Data elements for a computation window of data set 123. Component calculation module 131 may access or receive data elements 101, 102, 103, 104, 105, 106, 107 and 108 for computation window 122 of data set 123. Initialization module 132 may initialize component $Cd_1$ at the given lag (1 or maxl) using data elements 101-108, and initialization module 138 may initialize component $Cd_v$ at the given lag (1 or maxl) using data elements 101-108. For example, at the given lag (1 or maxl), initialization module 132 may be used for calculating component $Cd_1$ 141 at the given lag (1 or maxl) from data element 101 and data elements 102, 103, 104, 105, 106, 107 and 108. As depicted, component $Cd_1$ 141 includes contribution 151, contribution 152, and other contributions 153. Contribution 151 is a contribution from data element 101 to component $Cd_1$ 141 at the given lag (1 or maxl). Contribution 152 is a contribution from data element 102 to component $Cd_1$ 141 at the given lag (1 or maxl). Other contributions 153 are contributions from data elements 103, 104, 105, 106, 107 and 108 to component $Cd_1$ 141 at the given lag (1 or maxl). Similarly, initialization module 138 may be used for calculating component $Cd_v$ 145 at the given lag (1 or maxl) from data element 101 and data elements 102, 103, 104, 105, 106, 107 and 108. As depicted, component $Cd_v$ 145 at the given lag (1 or maxl) includes contribution 181, contribution 182, and other contributions 183. Contribution 181 is a contribution from data element 101 to component $Cd_v$ 145 at the given lag (1 or maxl). Contribution 182 is a contribution from data element 102 to component $Cd_v$ 145 at the given lag (1 or maxl). Other contributions 183 are contributions from data elements 103, 104, 105, 106, 107 and 108 to component $Cd_v$ 145 at the given lag (1 or maxl).

Method 200 includes storing the initialized v components into a storage space (210). For example, referring to 100A and 100B, after initialization module 132 initializing component $Cd_1$ using data elements 101-108, component calculation module 131 may store component $Cd_1$ into storage space 172, and similarly, after initialization module 138 initializing component $Cd_v$ using data elements 101-108, component calculation module 131 may store component $Cd_v$ into storage space 173.

Method 200 includes updating lag l (211). For example, lag update module 175 may update lag l with a new value (e.g., by increasing or decreasing its value by 1) within a specified range (from 1 to maxl).

Method 200 includes determining whether lag l is within the specified range (212). If yes, v components at the updated lag l will be initialized. If not, method 200 includes either accessing or receiving next data element or beginning another loop for indirectly iteratively calculating w=p−v components and then calculating an autocorrelation using one or more iteratively calculated components at all lags within a specified range.

Method 200 includes at the given lag l, initializing or calculating v(1≤v≤p, p≥1) components of an autocorrelation for data elements in a computation window of the specified size n (202). For example, initialization module 132 may initialize component $Cd_1$ at the given lag (2 or maxl−1) using data elements 101-108, and initialization module 138 may initialize component $Cd_v$ at the given lag (2 or maxl−1) using data elements 101-108.

Method 200 includes storing the initialized v components into a storage space (210). For example, referring to 100A and 100B, after initialization module 132 initializing component $Cd_1$ at the updated lag (2 or maxl−1) using data elements 101-108, component calculation module 131 may store component $Cd_1$ at the updated lag into storage space 172, and similarly, after initialization module 138 initializing component $Cd_v$ at the updated lag (2 or maxl−1) using data elements 101-108, component calculation module 131 may store component $Cd_v$ at the updated lag into storage space 173.

Method 200 includes repeating the above process until v(1≤v≤p) components at all lags within a specified range (from 1 to maxl) are initialized and stored.

Method 200 includes another loop for indirectly iteratively calculating w=p−v components and then calculating an autocorrelation using one or more iteratively calculated components at all lags within a specified range. Indirectly iteratively calculating w=p−v components and then calculating an autocorrelation using one or more iteratively calculated components at all lags within a specified range includes indirectly iteratively calculating w=p−v components and then calculating an autocorrelation using one or more iteratively calculated components at each of all lags within a specified range one by one. Method 200 includes initializing lag (213) to initialize the lag (e.g., setting to 1 or maxl).

Method 200 includes indirectly iteratively calculating each of w=p−v components at the given lag one by one as needed by using one or more components other than the component itself (214) when v<p, i.e., not all components are directly iteratively calculated. The w components are calculated only when an autocorrelation function is accessed. For example, referring to FIG. 1B where some components are directly iteratively calculated and some are indirectly iteratively calculated, calculation module 163 may indirectly iteratively calculate $Ci_1$ by using one or more components other than $Ci_1$, and calculation module 164 may indirectly iteratively calculate one or more components other than $Ci_v$. The one or more components may have been initialized, directly iteratively calculated, or indirectly iteratively calculated.

Method 200 includes calculating an autocorrelation at the given lag l on a needed basis. When an autocorrelation is accessed, the autocorrelation at the given lag will be calculated by using one or more iteratively calculated components (215); else only the v components will be iteratively calculated.

Method 200 includes updating lag l (216) and determining whether lag l is within a specified range (217). If yes, w components for the updated lag l will be indirectly iteratively calculated as needed (214) and an autocorrelation at the updated lag l will be calculated using one or more iteratively calculated components (215). 215, 216 and 217 may be repeated until autocorrelations at all lags within a specified range have been calculated with all components being directly iteratively calculated. For example, in architecture 100A, lag initialization 191 may set lag l=1 or l=maxl, and autocorrelation calculation module 192 may calculate autocorrelation 193 at the given lag l, and lag update module 194 may update the lag l by increasing or decreasing its value by one, then autocorrelation calculation module may calculate autocorrelation 193 at the updated lag l. This process may be repeated until all autocorrelation at lags for a specified range have been calculated. 214, 215, 216 and 217 may be repeated until autocorrelations at all lags within a specified range have been calculated with some components being indirectly iteratively calculated. For example, in architecture 100B, lag initialization 191 may set lag l=1 or l=maxl, and calculation module 163 may indirectly iteratively calculate $Ci_1$ by using one or more components other than $Ci_1$, and calculation module 164 may indirectly iteratively calculate one or more components other than $Ci_w$, . . . , and autocorrelation calculation module 192 may calculate autocorrelation 193 at the given lag l, and lag update module 194 may update the lag l by increasing or decreasing its value by one, then autocorrelation calculation module may calculate autocorrelation 193 for the updated lag l. This process (135, 192, 193 and 194) may be repeated until autocorrelations at all lags for a specified range have been calculated.

Method 200 includes accessing or receiving a data element to be removed from the computation window and a data element to be added to the computation window; setting an initial value for lag l (203). For example, referring to 100A and 100B, a data element 101 and a data element 109 may be accessed or received subsequent to accessing or receiving data elements 101-108. Lag initialization module 171 may set lag l with an initial value (e.g., 1 or maxl) when data element 109 is accessed or received.

Method 200 includes adjusting the computation window, including: removing an existing data element from the computation window and adding the accessed or received data element to the computation window (204). For example, computation window 122 may be transitioned to computation window 122A. Adjusting the computation window includes removing an existing (e.g., the least recent) data element from the computation window and adding the accessed or received data element to the computation window. For example, data element 101 is removed from computation window 122A and data element 109 is added to computation window 122A.

Method 200 includes at the given lag l directly iteratively calculating v(1≤v≤p) components of an autocorrelation for the adjusted computation window (205) including: accessing l data element(s) next to the removed data element in the computation window and l data element(s) next to the added data element in the computation window (206); accessing each of v(1≤v≤p) components (207); removing any contribution of the removed data element from each of the v components mathematically (208); adding a contribution of the added data element to each of the v components mathematically (209). Details are described below.

Directly iteratively calculating v components of an autocorrelation at the given lag l for the adjusted computation window includes accessing l data element(s) next to the removed data element in the computation window, the data element added to the computation window and l data element(s) next to the added data element in the computation window (206). For example, when at lag l=1, iterative algorithm 133 may access data element 102 which is next to the removed data element 101 and data element 108 which is next to the added data element 109. When at lag l=2, iterative algorithm 133 may access data elements 102 and 103 which are the 2 data elements next to the removed data element 101 and data elements 107 and 108 which are the 2 data elements next to the added data element 109 . . . . Similarly, when at lag l=1, iterative algorithm 139 may access data element 102 which is next to the removed data element 101, data element 109 which is added to computation window 122A and data element 108 which is next to the added data element 109. When at lag l=2, iterative algorithm 139 may access data elements 102 and 103 which are the 2 data elements next to the removed data element 101 and data elements 107 and 108 which are the 2 data elements next to the added data element 109 . . . .

Directly iteratively calculating v components of a next autocorrelation at the given lag l for the adjusted computation window includes accessing v(1≤v≤p) components of the autocorrelation at the given lag l in the previous computation window (207). For example, when at lag l=1, iterative algorithm 133 may access component $Cd_1$ 141 at lag l=1, and when at lag l=2, iterative algorithm 133 may access component $Cd_1$ 141 at lag l=2 . . . . Similarly, when at lag l=1, iterative algorithm 139 may access component $Cd_v$ 145 at lag l=1, and when at lag l=2, iterative algorithm 139 may access component $Cd_v$ 145 at lag l=2 . . . .

Directly iteratively calculating v components of a next autocorrelation at the given lag l for the adjusted computation window includes removing any contribution of the removed data element from each of the v components mathematically (208). For example, directly iteratively calculating component $Cd_1$ 143 at lag l=1 may include contribution removal module 133A mathematically removing contribution 151 (i.e., the contribution from data element 101)

from component $Cd_1$ 141 at lag l=1, and directly iteratively calculating component $Cd_1$ 143 at lag l=2 may include contribution removal module 133A removing contribution 151 (i.e., the contribution from data element 101) from component $Cd_1$ 141 at lag l=2 mathematically . . . . Similarly, directly iteratively calculating component $Cd_v$ 147 at lag l=1 may include contribution removal module 139A removing contribution 181 (i.e., the contribution from data element 101) from component $Cd_v$ 145 at lag l=1 mathematically, and directly iteratively calculating component $Cd_v$ 147 at lag l=2 may include contribution removal module 139A removing contribution 181 (i.e., the contribution from data element 101) from component $Cd_v$ 145 at lag l=2 mathematically . . . .

Directly iteratively calculating v components of an autocorrelation at the given lag l for the adjusted computation window includes adding a contribution of the added data element to each of the v components mathematically (209). For example, directly iteratively calculating component $Cd_1$ 143 at lag l=1 may include contribution addition module 133B adding contribution 154 to component 141 at lag l=1 mathematically, and directly iteratively calculating component $Cd_1$ 143 at lag l=2 may include contribution addition module 133B adding contribution 154 to component 141 at lag l=2 mathematically . . . . Similarly, directly iteratively calculating component $Cd_v$ 147 at lag l=1 may include contribution addition module 139B adding contribution 184 to component $Cd_v$ 145 at lag l=1 mathematically, and directly iteratively calculating component $Cd_v$ 147 at lag l=2 may include contribution addition module 139B adding contribution 184 to component $Cd_v$ 145 at lag l=2 mathematically . . . . Contribution 154 and 184 are contributions from data element 109.

As depicted in FIGS. 1A and 1B, at the given lag l, component $Cd_1$ 143 includes contribution 152 (a contribution from data element 102), other contributions 153 (contributions from data elements 103-108), and contribution 154 (a contribution from data element 109). Similarly, component $Cd_v$ 147 includes contribution 182 (a contribution from data element 102), other contributions 183 (contributions from data elements 103-108), and contribution 184 (a contribution from data element 109).

Method 200 includes store all those calculated v components at the updated lag l (210).

Method 200 includes updating the lag (211) and determining whether the lag is within a specified range (212). If yes, method 200 includes continuing to calculate v components for the updated lag (205). For example, after lag update module 175 updating lag l by increasing or decreasing the lag by 1, and if lag l is between 1 and maxl then for the same computation window, initialization module 132 in component $Cd_1$ calculation module 161 calculates component $Cd_1$ again and stores component $Cd_1$ at the new lag to storage space 172, and initialization module 138 in component $Cd_v$ calculation module 162 calculates component $Cd_v$ again and stores component $Cd_v$ at the new lag to storage space 173. 205, 211, 213 and 214 may be repeated until v components at all lags within a specified range have been calculated and stored.

Method 200 includes indirectly iteratively calculating each of w=p−v components at the given lag l one by one as needed by using one or more components other than the component itself (214) when v<p, i.e., not all components are directly iteratively calculated. The w components are calculated only when an autocorrelation function is accessed. For example, referring to FIG. 1B where some components are directly iteratively calculated and some are indirectly iteratively calculated, calculation module 163 may indirectly iteratively calculate $Ci_1$ by using one or more components other than $Ci_1$, and calculation module 164 may indirectly iteratively calculate $Ci_w$ by using one or more components other than $Ci_w$. The one or more components may have been initialized, directly iteratively calculated, or indirectly iteratively calculated.

Method 200 calculates autocorrelation on a needed basis. When an autocorrelation is accessed, the autocorrelation will be calculated by using one or more iteratively calculated components; else only the v components will be directly iteratively calculated. When an autocorrelation is accessed, method 200 includes initializing the lag (e.g., setting lag l to 1 or maxl) (213), indirectly iteratively calculating w components for the given lag l as needed (214), calculating an autocorrelation at the updated lag using one or more iteratively calculated components (215), updating the lag with a new value (e.g., increasing or decreasing its value by 1), and determining whether all lags within a specified range have been enumerated . . . . 215, 216 and 217 may be repeated until autocorrelations at all lags within a specified range have been calculated with all components being directly iteratively calculated. For example, in architecture 100A, lag initialization 191 may set lag l=1, and autocorrelation calculation module 192 may calculate autocorrelation 193 at the given lag, and lag update module 194 may update the lag by increasing its value by one, then autocorrelation calculation module may calculate autocorrelation 193 for the updated lag. This process may be repeated until all autocorrelation at lags for a specified range have been calculated. 214, 215, 216 and 217 may be repeated until autocorrelations at all lags within a specified range have been calculated with some components being indirectly iteratively calculated. For example, in architecture 100B, lag initialization 191 may set lag l=1, and calculation module 163 may indirectly iteratively calculate $Ci_1$ by using one or more components other than $Ci_1$, and calculation module 164 may indirectly iteratively calculate $Ci_w$ by using one or more components other than $Ci_w$, . . . , and autocorrelation calculation module 192 may calculate autocorrelation 193 at the given lag, and lag update module 194 may update the lag by increasing or decreasing its value by one, then autocorrelation calculation module may calculate autocorrelation 193 for the updated lag. This process (135, 192, 193 and 194) may be repeated until autocorrelations at all lags for a specified range have been calculated. Once autocorrelation at all lags for a specified range have been calculated, method 200 includes accessing or receiving next data element.

203-209 may be repeated as additional data elements are accessed or received. 210-217 may be repeated as needed. For example, subsequent to accessing or receiving data elements 101 and 109 and calculating component $Cd_1$ 143 and component $Cd_v$ 147 at all lags within a specified range, data elements 102 and 110 may be accessed or received (203). Once a data element to be removed and a data element to be added are accessed or received, method 200 includes adjusting the computation window by removing the to-be-removed data element from the computation window and adding the to-be-added data element to the computation window (204). Computation window 122A may be transitioned to computation window 122B by removing data element 102 and adding data element 110.

Method 200 includes at a given lag l, directly iteratively calculating v components of an autocorrelation for the adjusted computation window by using the v components for the previous computation window (205), including accessing l data element(s) next to the removed data element in the computation window and l data elements next to the added data element in the computation window (206) and accessing the v components (207) and removing any contribution of the removed data element from each of the v components mathematically (208) and adding a contribution of the added data element to each of the v components mathematically (209). For example referring to 100A and 100B, at a given lag l, e.g. l=1, iterative algorithm 133 may be used for directly iteratively calculating component $Cd_1$ 144 at lag 1 (for computation window 122B) by using component $Cd_1$ 143 at lag l (for computation window 122A). Iterative algorithm 133 may access data element 103 which is next to removed data element 102 and data element 109 which is next to added data element 110. Iterative algorithm 133 may access component $Cd_1$ 143 at lag l=1. Directly iteratively calculating component $Cd_1$ 144 at lag l=1 may include contribution removal module 133A removing contribution 152 (i.e., the contribution from data element 102) from component $Cd_1$ 143 at lag l=1 mathematically. Directly iteratively calculating component $Cd_1$ 144 at lag l=1 may include contribution addition module 133B adding contribution 155 to component $Cd_1$ 143 at lag l=1 mathematically. Contribution 155 is a contribution from data element 110. Similarly, at a given lag l, e.g. l=1, iterative algorithm 139 may be used for directly iteratively calculating component $Cd_v$ 148 at lag l=1 (for computation window 122B) by using component $Cd_v$ 147 at lag l=1 (for computation window 122A). Iterative algorithm 139 may access data element 103 which is next to removed data element 102 and data element 109 which is next to added data element 110. Iterative algorithm 139 may access component $Cd_v$ 147 at lag l=1. Directly iteratively calculating component $Cd_v$ 148 at lag l=1 may include contribution removal module 139A removing contribution 182 (i.e., the contribution from data element 102) from component $Cd_v$ 147 at lag l=1 mathematically. Directly iteratively calculating component $Cd_v$ 148 may include contribution addition module 139B adding contribution 185 to component $Cd_v$ 147 at lag l=1. Contribution 185 is a contribution from data element 110 mathematically.

Method 200 includes storing the directly iteratively calculated v components at the given lag l (210). For example, component $Cd_1$ 144 at the given lag l may be stored in storage space 172 and component $Cd_1$ 148 at the given lag l may be stored in storage space 173.

As depicted, at a given lag l, component $Cd_1$ 144 includes other contributions 153 (contributions for data elements 103-108), contribution 154 (a contribution from data element 109), and contribution 155 (a contribution from data element 110), and component $Cd_v$ 148 includes other contributions 183 (contributions for data elements 103-108), contribution 184 (a contribution from data element 109), and contribution 185 (a contribution from data element 110).

Method 200 includes updating lag l and determining whether v components at all lags within a specified range have been calculated and stored. If not, method 200 includes continuing to directly iteratively calculate v components at the updated lag. 203, 204, 205, 210, 211 and 212 may be repeated until v components for all lags within a specified range have been directly iteratively calculated and stored. If yes, method 200 includes indirectly iteratively calculating w components and autocorrelations at all lags within a specified range as needed.

Once v components for all lags within a specified range have been calculated and stored, method 200 includes another loop for indirectly iteratively calculating w components and autocorrelations at all lags within a specified range as needed. The loop will be executed only when an autocorrelation function is accessed. If no autocorrelation function is accessed, method 200 includes continuing to access or receive next data element to be removed and next data element to be added and starts calculation for next computation window (203). If an autocorrelation function is accessed, method 200 includes initializing lag l (e.g., setting lag l=1 or lag l=maxl) (213), indirectly iteratively calculating w components at the given lag (214), calculating autocorrelation at the given lag using one or more initialized or iteratively calculated components at the given lag (215), then method 200 includes updating the lag (e.g., increasing or decreasing its value by 1) (216) and determining whether autocorrelation for all lags within a specified range have been calculated (217). If yes, method 200 includes continuing to access or receive a data element to be removed and a data element to be added and starts calculation for next computation window (203). If no, method 200 includes updating lag l (e.g., increasing or decreasing its value by 1) (216), and continue to calculate w components at the given lag (214) and autocorrelation at the given lag using one or more components at the given lag (215) until autocorrelation for all lags within a specified range have been calculated (217). 214, 215, 216 and 217 may be repeated until autocorrelations for a given computation window at all lags within a specified range have been calculated.

When a next data element to be removed and a next data element to be added are accessed or received, component $Cd_1$ 144 may be used for directly iteratively calculating a next component $Cd_1$ and component $Cd_v$ 148 may be used for directly iteratively calculating a next component $Cd_v$.

Figure 3A:
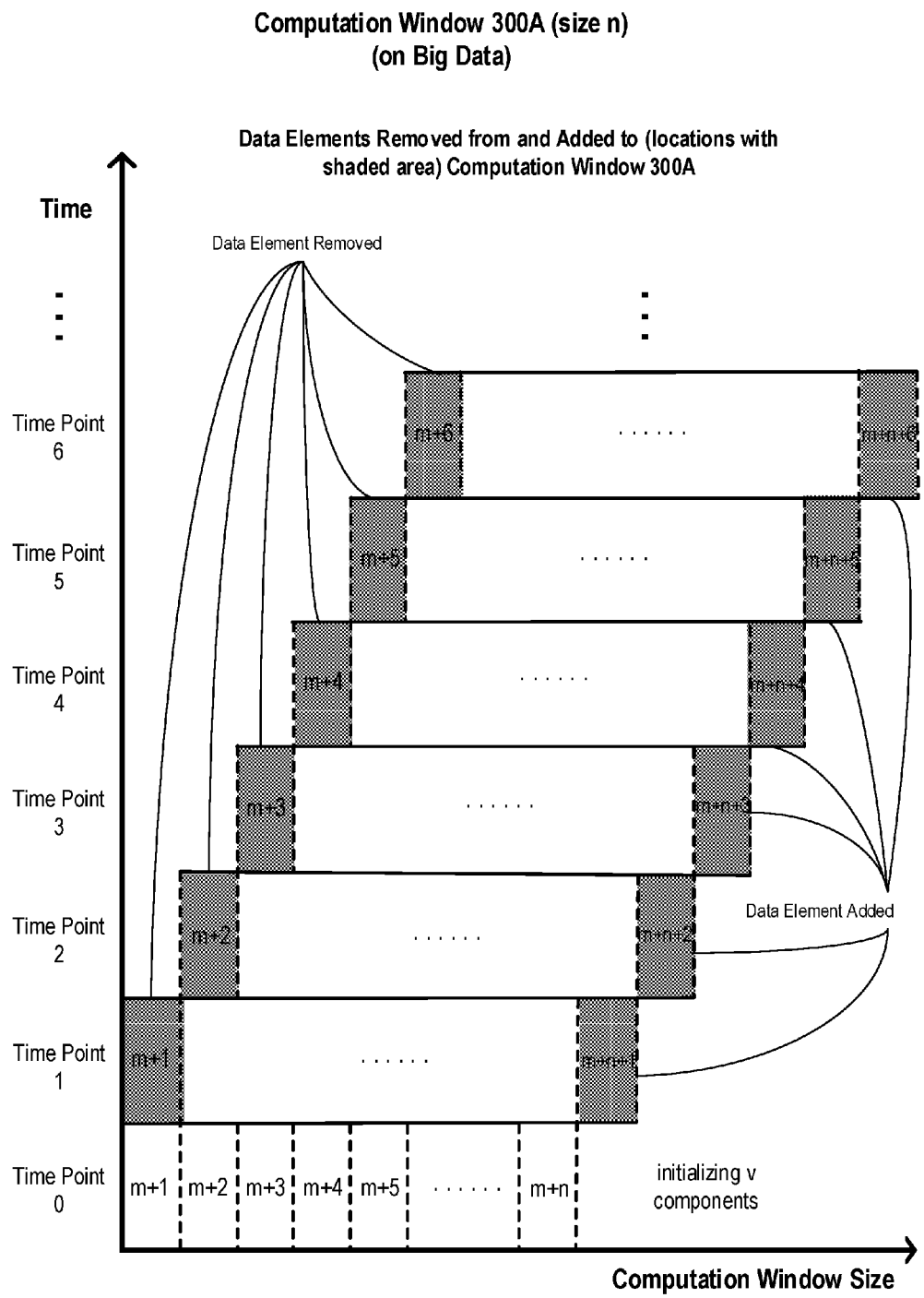
FIG. 3A illustrates data that is removed from and data is added to a computation window 300A for iteratively calculating an autocorrelation at all lags within a specified range (from 1 to maxl) when the computation window 300A is moving to the right side.

FIG. 3A illustrates data elements that are removed from and added to computation window 300A for iteratively calculating an autocorrelation function on Big Data. Computation window 300A moves to the right side direction. Referring to FIG. 3A, an existing data element is always removed from the left end and a new data element is always added to the right end of computation window 300A.

Figure 3B:
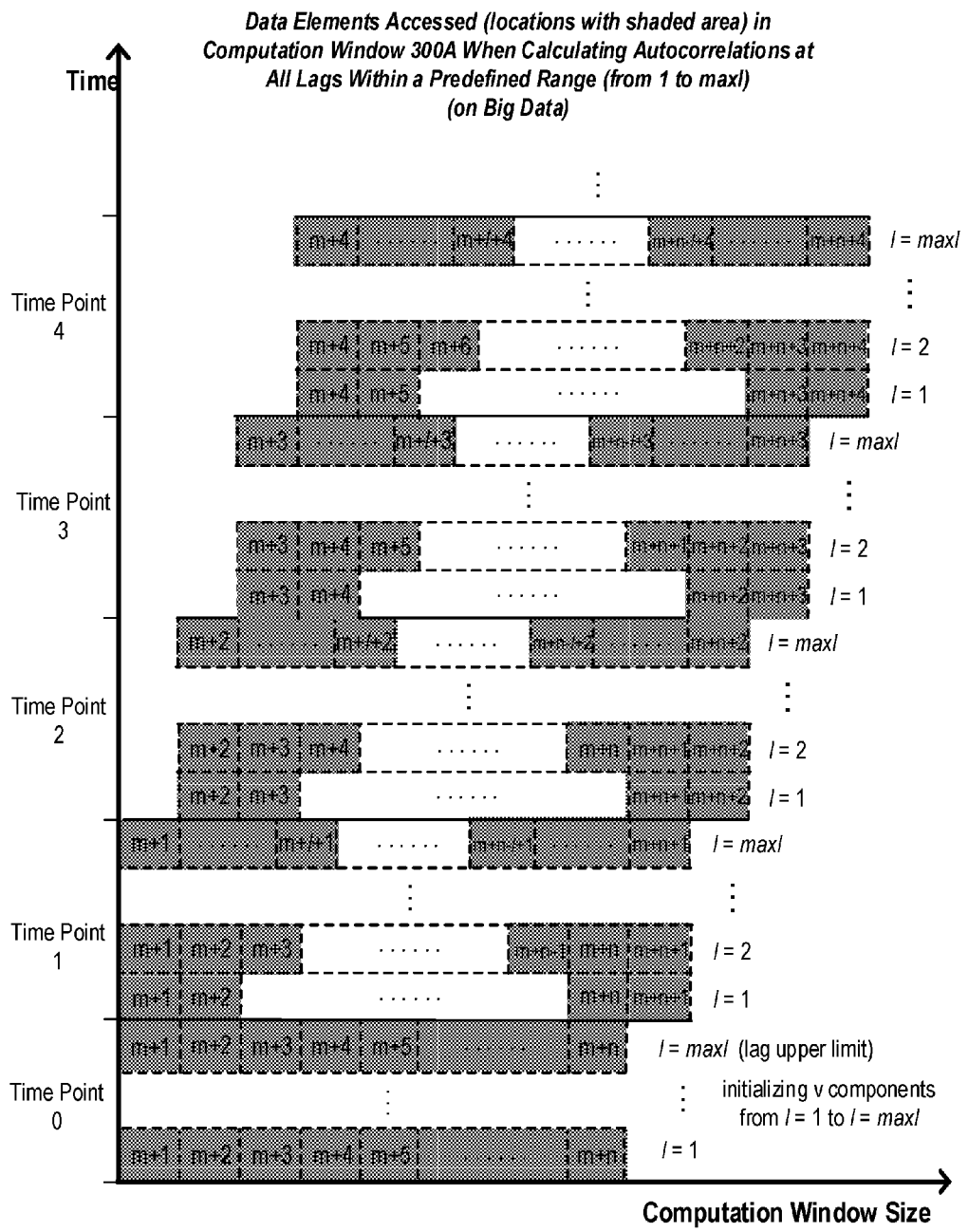
FIG. 3B illustrates data that is accessed from a computation window 300A for iteratively calculating autocorrelations at all lags within a specified range (from 1 to maxl) when the computation window 300A is moving to the right side.

FIG. 3B illustrates data elements that are accessed from computation window 300A for iteratively calculating an autocorrelation function on Big Data. For computation window 300A, the first n data elements are accessed for initially calculating one or more ($v(1 \leq v \leq p)$) components at each of lags ranging from 1 to maxl for the first computation window and then indirectly iteratively calculating w=p-v components as needed and then calculating an autocorrelation function as needed. As time progresses, a least recent data element, e.g., $(m+1)^{th}$ data element, is removed and a new data element, e.g., $(m+n+1)^{th}$ data element, is added to computation window 300A. One or more ($v(1 \leq v \leq p)$) components at each of lags ranging from 1 to maxl for the adjusted computation window are then directly iteratively calculated by using v components calculated for the first computation window. When lag l=1, 4 data elements are accessed which includes the data element removed, 1 data element next to the data element removed, the data element added and 1 data element next to the data element added. When lag l=2, 6 data elements are accessed which includes the data element removed, 2 data elements next to the data element removed, the data element added and 2 data elements next to the data element added . . . . And when lag l=maxl, 2*(l+1) data elements are accessed for directly iteratively calculating v components at lag l=maxl. The 2*(l+1) data elements includes the data element removed, l data elements next to the data element removed, the data element added and l data elements next to the data element added. Then, lag is initialized with a value (e.g., 1 or upper lag limit maxl), and then indirectly iteratively calculating w=p−v components at each of lags ranging from 1 to maxl as needed and then calculating an autocorrelation function using one or more iteratively calculated components at each of lags ranging from 1 to maxl as needed. Then, computation window 300A is adjusted again by removing a least recent data element and adding a new data element . . . . For a given iterative algorithm, v is a constant, so the number of operations for directly iteratively calculating v components is a constant, and the number of operations for indirectly iteratively calculating w=p−v components is also a constant. So for each given lag, the computation workload is reduced. An autocorrelation function at all lags ranging from 1 to maxl is calculated, so the overall computation workload is reduced. The larger the n, the more substantial the reduction in computation workload.

Figure 3C:
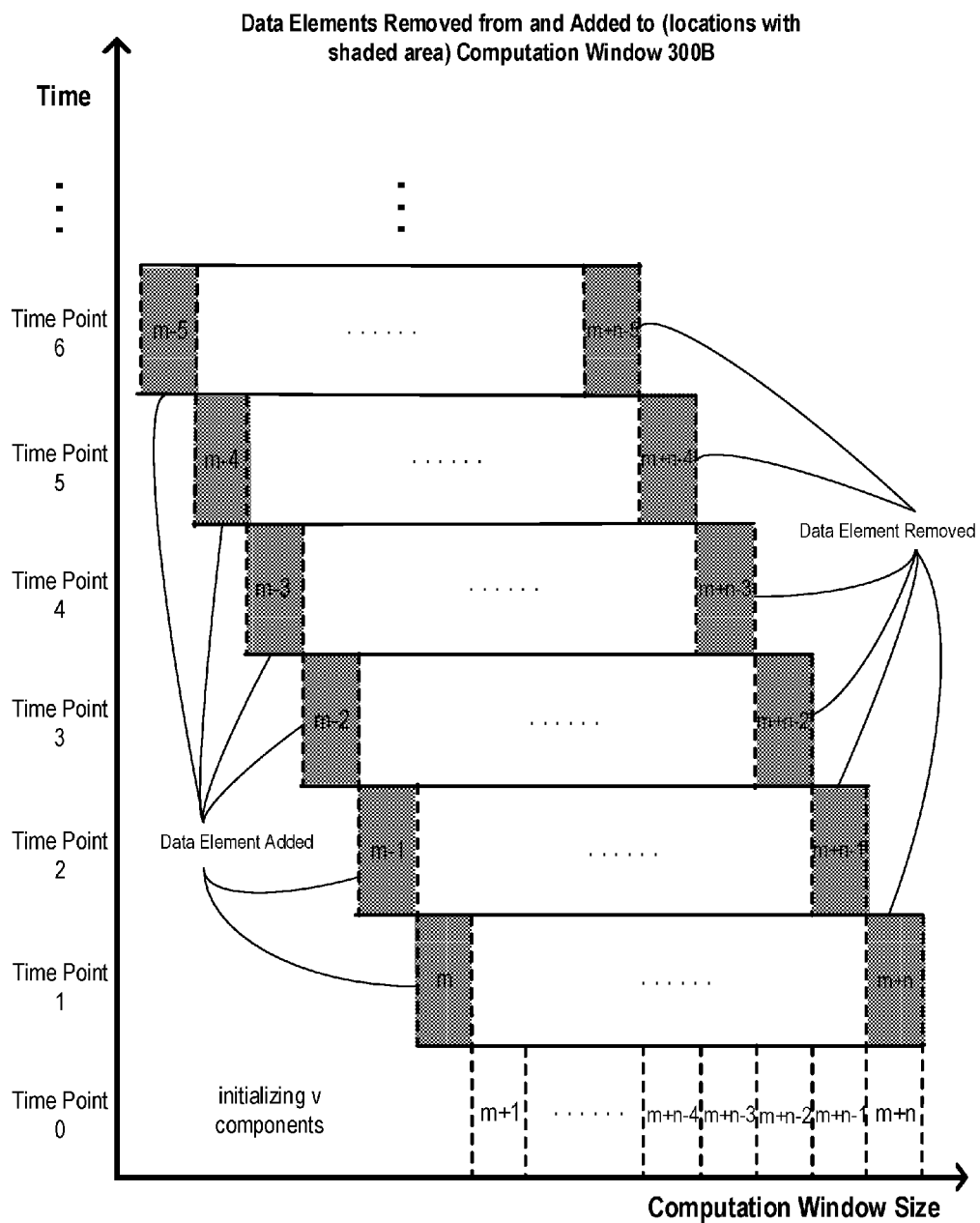
FIG. 3C illustrates data that is removed from and data is added to a computation window 300B for iteratively calculating an autocorrelation at all lags within a specified range (from 1 to maxl) when the computation window 300B is moving to the left side.

FIG. 3C illustrates data elements that are removed from and added to, one of the two computation windows, computation window 300B for iteratively calculating an autocorrelation function on Big Data. Computation window 300B moves to the left side direction. Referring to FIG. 3C, a recent data element is always removed from the right end and a least recent data element is always added to the left end of computation window 300B.

Figure 3D:
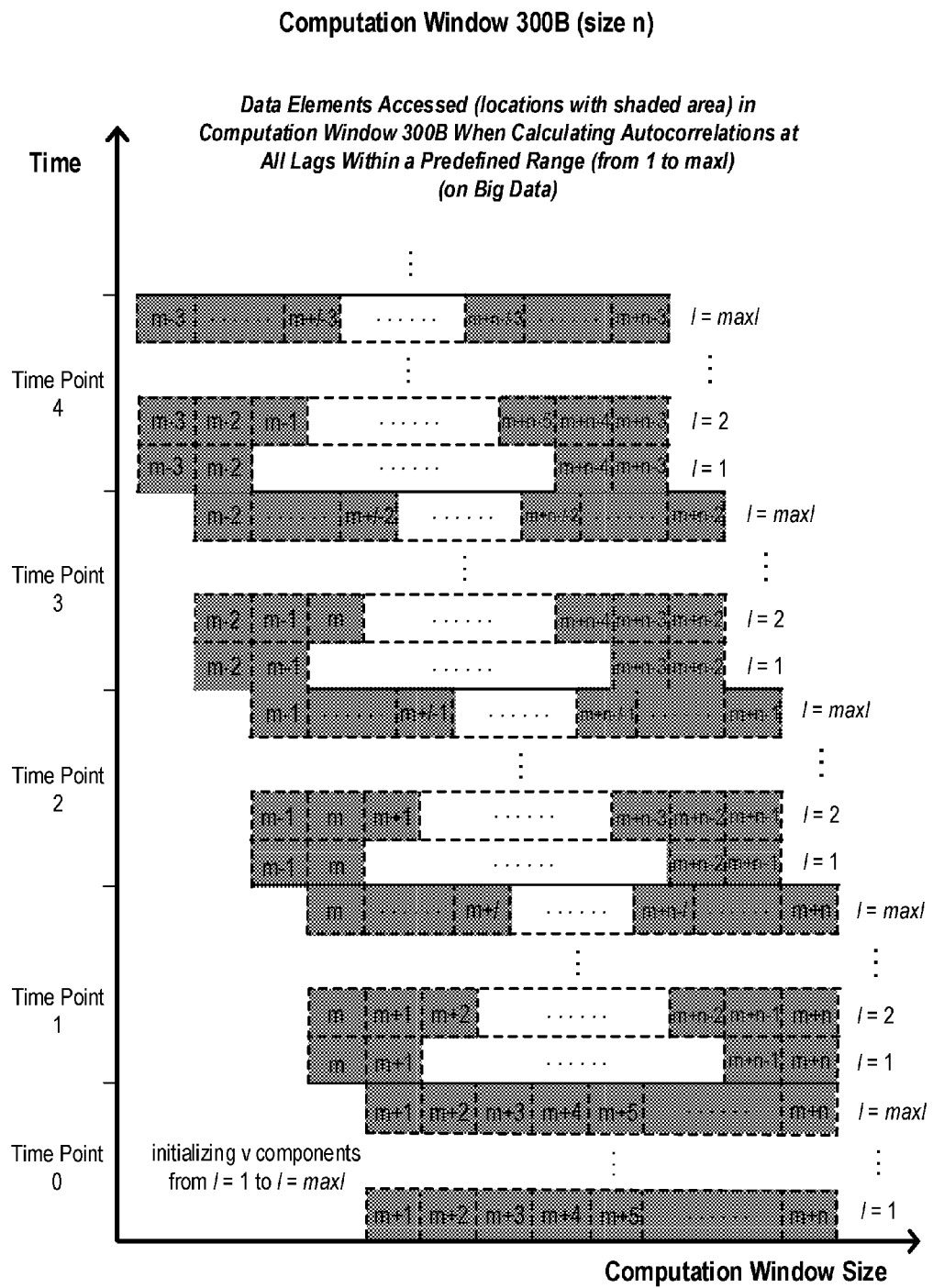
FIG. 3D illustrates data that is accessed from a computation window 300B for iteratively calculating autocorrelations at all lags within a specified range (from 1 to maxl) when the computation window 300B is moving to the left side.

FIG. 3D illustrates data elements that are accessed from, one of the two computation windows, computation window 300B for iteratively calculating an autocorrelation function on Big Data. For computation window 300B, the first n data elements are accessed for initially calculating one or more (v(1≤v≤p)) components at each of lags ranging from 1 to maxl for the first computation window and then indirectly iteratively calculating w=p−v components and calculating an autocorrelation function as needed. As time progresses, a most recent data element, e.g., $(m+n)^{th}$ data element, is removed and a least recent data element, e.g., $m^{th}$ data element, is added to computation window 300B. One or more (v(1≤v≤p)) components at each of lags ranging from 1 to maxl for the adjusted computation window are then directly iteratively calculated by using v components calculated for the first computation window. When lag l=1, 4 data elements are accessed which includes the data element removed, 1 data element next to the data element removed, the data element added and 1 data element next to the data element added. When lag l=2, 6 data elements are accessed which includes the data element removed, 2 data elements next to the data element removed, the data element added and 2 data elements next to the data element added . . . . And when lag l=maxl, 2*(l+1) data elements are accessed for directly iteratively calculating v components at lag l=maxl. The 2*(l+1) data elements includes the data element removed, l data elements next to the data element removed, the data element added and l data elements next to the data element added. Then, lag is initialized with a value (e.g., 1 or upper lag limit maxl), and then indirectly iteratively calculating w=p−v components at each of lags ranging from 1 to maxl as needed and then calculating an autocorrelation function using one or more iteratively calculated components at each of lags ranging from 1 to maxl as needed. Then, computation window 300B is adjusted again by removing a most recent data element and adding a least recent data element . . . . For a given iterative algorithm, v is a constant, so the number of operations for directly iteratively calculating v components is a constant, and the number of operations for indirectly iteratively calculating w=p−v components is also a constant. So for each given lag, the computation workload is reduced. An autocorrelation function at all lags ranging from 1 to maxl is calculated, so the overall computation workload is reduced. The larger the n, the more substantial the reduction in computation workload.

FIG. 4A illustrates the definition of autocorrelation. Suppose a computation window $X=(x_{m+1}, x_{m+2}, \ldots, x_{m+n})$ is a window of a Big Data set which includes the data elements to be involved in autocorrelation function calculation. The computation window may move to either right or left direction. For example, when processing data elements newly added to the Big Data set, the computation window moves to the right. In this case, a data is added to the right side of the computation window and a data is removed from the left side of the computation window. When recalculating autocorrelation on data elements previously added to the Big Data set, the computation window moves to the left. In this case, a data is added to the left side of the computation window and a data is removed from the right side of the computation window. The equations for calculating one or more (p (p≥1)) components for those two cases are different. To distinguish them, define the adjusted computation window as $X^I$ for the former case and $X^{II}$ for the latter case. Equation 401 is a traditional equation for calculating a sum $S_k$ of all the data elements in X. Equation 402 is a traditional equation for calculating a mean $\bar{x}_k$ of all the data elements in X. Equation 403 is a traditional equation for calculating an autocorrelation $\rho_{(k,l)}$ with a lag l of all the data elements in a computation window of size n. Equation 404 is a traditional equation for calculating a sum $S^I_{k+1}$ of all the data elements in the adjusted computation window $X^I$. Equation 405 is a traditional equation for calculating a mean $\bar{x}^I_{k+1}$ of all the data elements in the adjusted computation window $X^I$. Equation 406 is a traditional equation for calculating an autocorrelation $\rho^I_{(k+1,l)}$ of all the data elements in the adjusted computation window $X^I$. As stated earlier, when the computation window moves to the left, the adjusted computation window is defined as $X^{II}$. Equation 407 is a traditional equation for calculating a sum $S^{II}_{k+1}$ of all the data elements in the adjusted computation window $X^{II}$. Equation 408 is a traditional equation for calculating a mean $\bar{x}^{II}_{k+1}$ of all the data elements in the adjusted computation window $X^{II}$. Equation 409 is a traditional equation for calculating an autocorrelation $\rho_{(k+1,l)}$ of all the data elements in the adjusted computation window $X^{II}$.

FIG. 4B illustrates some example components of an autocorrelation and basic iterative component calculation equations. A component of an autocorrelation is a quantity or expression appearing in the autocorrelation's definition equation or any transforms of the equation. The following are some example components of an autocorrelation.

$$S_k = \sum_1^n x_i$$

$$\bar{x}_k = \frac{1}{n}\sum_1^n x_i$$

$$SS_k = \sum_1^n x_i^2$$

$$SX_k = \sum_1^n (x_i - \bar{x}_k)^2$$

$$covX_{(k,l)} = \sum_{1+l}^n (x_i - \bar{x}_k)(x_{i-l} - \bar{x}_k) \quad (l \text{ is the lag})$$

An autocorrelation may be calculated based on one or more (p(p≥1)) components or combinations of them, so there are multiple algorithms supporting iterative autocorrelation function calculation. To illustrate how to use components to iteratively calculate autocorrelation, three different iterative autocorrelation function calculation algorithms are given as examples. A new iteration of calculation is started each time there is a data change in the computation window (e.g., 122→122A→122B). A sum or a mean is the basic component to be used for calculating an autocorrelation. The equations for iteratively calculating a sum or a mean are basic iterative component equations which will be used by all example iterative autocorrelation calculation algorithms, therefore they are presented in FIG. 4B instead of each example iterative autocorrelation calculation algorithm. As stated earlier, when the computation window moves to the right, the adjusted computation window is defined as $X^I$. Equation 410 is an equation for directly iteratively calculating a sum $S^I_{k+1}$ of all the data elements in the adjusted computation window $X^I$ by removing any contribution of the removed data element from the previous sum mathematically and adding a contribution of the added data element to the previous sum mathematically. Equation 411 is an equation for directly iteratively calculating a mean $\bar{x}^I_{k+1}$ of all the data elements in the adjusted computation window $X^I$ by removing any contribution of the removed data element from the previous mean mathematically and adding a contribution of the added data element to the previous mean mathematically. As stated earlier, when the computation window moves to the left, the adjusted computation window is defined as $X^{II}$. Equation 412 is an equation for iteratively calculating a sum $S^{II}_{k+1}$ of all the data elements in the adjusted computation window $X^{II}$. Equation 413 is an equation for iteratively calculating a mean $\bar{x}^{II}_{k+1}$ of all the data elements in the adjusted computation window $X^{II}$. Either a sum or a mean will be used in all three iterative autocorrelation function calculation algorithms described below.

FIG. 4C illustrates the first example iterative autocorrelation calculation algorithm (iterative algorithm 1). As depicted in FIG. 4C, when a computation window moves to the right, iterative algorithm 1 comprises iterative calculation of components $S^I_{k+1}$ or $\bar{x}^I_{k+1}$, $SS^I_{k+1}$, $SX^I_{k+1}$, and $covX^I_{(k+1,l)}$, and an autocorrelation $\rho^I_{(k+1,l)}$ may be calculated by using components $SX^I_{k+1}$ and $covX^I_{(k+1,l)}$ once they are calculated. Equation 410 may be used for directly iteratively calculating component $S^I_{k+1}$ if component $S_k$ is available. Equation 411 may be used for directly iteratively calculating component $\bar{x}^I_{k+1}$ if component $\bar{x}_k$ is available. Equation 414 is a traditional equation for calculating component $SS_k$ in the computation window X. Equation 415 is a traditional equation for calculating component $SS^I_{k+1}$ in the adjusted computation window $X^I$. Equation 416 may be used for directly iteratively calculating component $SS^I_{k+1}$ in the adjusted computation window $X^I$ if component $SS_k$ is available. Equation 417 is a traditional equation for calculating component $SX_k$ in the computation window X. Equation 418 is a traditional equation for calculating component $SX^I_{k+1}$ in the adjusted computation window $X^I$. Equations 419 may be used for indirectly iteratively calculating component $SX^I_{k+1}$ in the adjusted computation window $X^I$ if components $S^I_{k+1}$ or $\bar{x}^I_{k+1}$ and $SS^I_{k+1}$ are available. Equations 419 comprise multiple equations but only one of them is needed depending on if a sum or a mean or both are available. Equation 420 is a traditional equation for calculating component $covX_{(k,l)}$ in the computation window X. Equation 421 is a traditional equation for calculating component $covX^I_{(k+1,l)}$ in the adjusted computation window $X'$. Equations 422 may be used for directly iteratively calculating component $covX^I_{(k+1,l)}$ in the adjusted computation window $X^I$ if components $covX_{(k,l)}$, $SS^I_{k+1}$, $S_k$ or $\bar{x}_k$ and $S^I_{k+1}$ or $\bar{x}^I_{k+1}$ are available. Equations 422 comprise multiple equations but only one of them is needed depending on if a sum or a mean or both are available. Equation 423 may be used for indirectly calculating the autocorrelation $\rho^I_{(k+1,l)}$ at a given lag l for the adjusted computation window $X^I$ once components $covX^I_{(k+1,l)}$ and $SX^I_{k+1}$ are calculated. Equations 422 and 423 may be repeatedly applied for calculating autocorrelation with different lags. As depicted in FIG. 4C Cont'd, when a computation window moves to the left, iterative algorithm 1 comprises iterative calculation of components $S^{II}_{k+1}$ or $\bar{x}^{II}_{k+1}$, $SS^{II}_{k+1}$, $SX^{II}_{k+1}$, and $covX^{II}_{(k+1,l)}$, and an autocorrelation $\rho^{II}_{(k+1,l)}$ may be directly calculated by using components $SX^{II}_{k+1}$ and $covX^{II}_{(k+1,l)}$ once they are calculated. Equation 412 may be used for directly iteratively calculating component $S^{II}_{k+1}$ if component $S_k$ is available. Equation 413 may be used for directly iteratively calculating component $\bar{x}^{II}_{k+1}$ if component $\bar{x}_k$ is available. Equation 424 is a traditional equation for calculating component $SS_k$ in the computation window X. Equation 425 is a traditional equation for calculating component $SS^{II}_{k+1}$ in the adjusted computation window $X^{II}$. Equation 426 may be used for directly iteratively calculating component $SS^{II}_{k+1}$ in the adjusted computation window $X^{II}$ if component $SS_k$ is available. Equation 427 is a traditional equation for calculating component $SX_k$ in the computation window X. Equation 428 is a traditional equation for calculating component $SX^{II}_{k+1}$ in the adjusted computation window $X^{II}$. Equations 429 may be used for indirectly iteratively calculating component $SX^{II}_{k+1}$ in the adjusted computation window $X^{II}$ if components $S^{II}_{k+1}$ and/or $\bar{x}^{II}_{k+1}$ and $SS^{II}_{k+1}$ are available. Equations 429 comprise multiple equations but only one of them is needed depending on if a sum or a mean or both are available. Equation 430 is a traditional equation for calculating component $covX_{(k,l)}$ in the computation window X. Equation 431 is a traditional equation for calculating component $covX^{II}_{(k+1,l)}$ in the adjusted computation window $X^{II}$. Equations 432 may be used for directly iteratively calculating component $covX^{II}_{(k+1,l)}$ in the adjusted computation window $X^{II}$ if components $covX_{(k,l)}$, $SS^{II}_{k+1}$, $S_k$ or $\bar{x}_k$ and $S^{II}_{k+1}$ or $\bar{x}^{II}_{k+1}$ are available. Equations 432 comprise multiple equations but only one of them is needed depending on if a sum or a mean or both are available. Equation 433 may be used for indirectly calculating the autocorrelation $\rho^{II}_{(k+1,l)}$ at a given lag l for the adjusted computation window $X^{II}$ once components $covX^{II}_{(k+1,l)}$ and $SX^{II}_{k+1}$ are calculated. Equations 432 and 433 may be repeatedly applied for calculating autocorrelation with different lags.

FIG. 4D illustrates the second example iterative autocorrelation calculation algorithm (iterative algorithm 2). As depicted in FIG. 4D, when a computation window moves to the right, iterative algorithm 2 comprises iterative calculation of components $S^I_{k+1}$ or $\bar{x}^I_{k+1}$, $SX^I_{k+1}$, and $covX^I_{(k+1,l)}$, and an autocorrelation may be calculated by using components $SX^I_{k+1}$ and $covX^I_{(k+1,l)}$, once they are calculated. Equation 410 may be used for directly iteratively calculating component $S^I_{k+1}$ if component $S_k$ is available. Equation 411 may be used for directly iteratively calculating component $\bar{x}^I_{k+1}$ if component $\bar{x}_k$ is available. Equation 434 is a traditional equation for calculating component $SX_k$ in the computation window X. Equation 435 is a traditional equation for calculating component $SX^I_{k+1}$ in the adjusted computation window $X^I$. Equations 436 may be used for directly iteratively calculating component $SX^I_{k+1}$ in the adjusted computation window $X^I$ if components $SX_k$, $S^I_{k+1}$ and/or $\bar{x}^I_{k+1}$ are available. Equations 436 comprise multiple equations but only one of them is needed depending on if a sum or a mean or both are available. Equation 437 is a traditional equation for calculating component $covX_{(k,l)}$ in the computation window X. Equation 438 is a traditional equation for calculating component $covX^I_{(k+1,l)}$ in the adjusted computation window $X^I$. Equations 439 may be used for directly iteratively calculating component $covX^I_{(k+1,l)}$ in the adjusted computation window $X^I$ if components $covX_{(k,l)}$, $S_k$ or $\bar{x}_k$ and $S^I_{k+1}$ or $\bar{x}^I_{k+1}$ are available. Equations 439 comprise multiple equations but only one of them is needed depending on if a sum or a mean or both are available. Equation 440 may be used for indirectly iteratively calculating the autocorrelation $\rho^I_{(k+1,l)}$ for the adjusted computation window $X^I$ using components $covX^I_{(k+1,l)}$ and $SX^I_{k+1}$ once they are calculated. As depicted in FIG. 4D Cont'd, when a computation window moves to the left, iterative algorithm 2 comprises iterative calculation of components $S^{II}_{k+1}$ or $\bar{x}^{II}_{k+1}$, $SX^{II}_{k+1}$, and $covX^{II}_{(k+1,l)}$, and an autocorrelation $\rho^{II}_{(k+1,l)}$ may be calculated by using components $SX^{II}_{k+1}$ and $covX^{II}_{(k+1,l)}$ once they are calculated. Equation 412 may be used for directly iteratively calculating component $S^{II}_{k+1}$ if component $S_k$ is available. Equation 413 may be used for directly iteratively calculating component $\bar{x}^{II}_{k+1}$ if component $\bar{x}_k$ is available. Equation 441 is a traditional equation for calculating $SX_k$ in the computation window X. Equation 442 is a traditional equation for calculating component $SX^{II}_{k+1}$ in the adjusted computation window $X^{II}$. Equations 443 may be used for directly iteratively calculating component $SX^{II}_{k+1}$ in the adjusted computation window $X^{II}$ if components $SX_k$, $S^{II}_{k+1}$ and/or $\bar{x}^{II}_{k+1}$ are available. Equations 443 comprise multiple equations but only one of them is needed depending on if a sum or a mean or both are available. Equation 444 is a traditional equation for calculating component $covX_{(k,l)}$ in the computation window X. Equation 445 is a traditional equation for calculating component $covX^{II}_{(k+1,l)}$ in the adjusted computation window $X^{II}$. Equations 446 may be used for directly iteratively calculating component $covX^{II}_{(k+1,l)}$ in the adjusted computation window $X^{II}$ if components $covX_{(k,l)}$, $S_k$ or $\bar{x}_k$ and $S^{II}_{k+1}$ or $\bar{x}^{II}_{k+1}$ are available. Equations 446 comprise multiple equations but only one of them is needed depending on if a sum or a mean or both are available. Equation 447 may be used for calculating the autocorrelation $\rho_{(k+1,l)}$ for the adjusted computation window $X^{II}$ using components $covX^{II}_{(k+1,l)}$ and $SX^{II}_{k+1}$ once they are calculated.

FIG. 4E illustrates the third example iterative autocorrelation calculation algorithm (iterative algorithm 3). As depicted in FIG. 4E, iterative algorithm 3 comprises iterative calculation of components $S^I_{k+1}$ or $\bar{x}^I_{k+1}$, $SX^I_{k+1}$, and $covX^I_{(k+1,l)}$, and an autocorrelation may be calculated by using components $SX^I_{k+1}$ and $covX^I_{(k+1,l)}$, once they are calculated. Equation 410 may be used for directly iteratively calculating component $S^I_{k+1}$ if component $S_k$ is available. Equation 411 may be used for directly iteratively calculating component $\bar{x}^I_{k+1}$ if component $\bar{x}_k$ is available. Equation 448 is a traditional equation for calculating component $SX_k$ in the computation window X. Equation 449 is a traditional equation for calculating component $SX^I_{k+1}$ in the adjusted computation window $X^I$. Equations 450 are equations that may be used for directly iteratively calculating component $SX^I_{k+1}$ in the adjusted computation window $X^I$ if components $SX_k$, $S^I_{k+1}$ and/or $\bar{x}^I_{k+1}$ are available. Equations 450 comprise multiple equations but only one of them is needed depending on if a sum or a mean or both are available. Equation 451 is a traditional equation for calculating component $covX_{(k,l)}$ in the computation window X. Equation 452 is a traditional equation for calculating component $covX^I_{(k+1,l)}$ in the adjusted computation window $X^I$. Equations 453 are equations that may be used for directly iteratively calculating component $covX^I_{(k+1,l)}$ in the adjusted computation window $X^I$ if components $covX_{(k,l)}$, $S_k$ or $\bar{x}_k$ and $S^I_{k+1}$ or $\bar{x}^I_{k+1}$ are available. Equations 453 comprise multiple equations but only one of them is needed depending on if a sum or a mean or both are available. Equation 454 is an equation that may be used for calculating the autocorrelation $\rho^I_{(k+1,l)}$ for the adjusted computation window $X^I$ using components $covX^I_{(k+1,l)}$ and $SX^I_{k+1}$ once they are calculated. As depicted in FIG. 4E Cont'd, when a computation window moves to the left, iterative algorithm 3 comprises iterative calculation of components $S^{II}_{k+1}$ or $\bar{x}^{II}_{k+1}$, $SX^{II}_{k+1}$, and $covX^{II}_{(k+1,l)}$, and an autocorrelation may be calculated by using components $SX^{II}_{k+1}$ and $covX^{II}_{(k+1,l)}$, once they are calculated. Equation 412 may be used for directly iteratively calculating component $S^{II}_{k+1}$ if component $S_k$ is available. Equation 413 may be used for directly iteratively calculating component $\bar{x}^{II}_{k+1}$ if component $\bar{x}_k$ is available. Equation 455 is a traditional equation for calculating component $SX_k$ in the computation window X. Equation 456 is a traditional equation for calculating component $SX^{II}_{k+1}$ in the adjusted computation window $X^{II}$. Equations 457 are equations that may be used for directly iteratively calculating component $SX^{II}_{k+1}$ in the adjusted computation window $X^{II}$ if components $SX_k$, $S_k$ and/or $\bar{x}_k$, and $S^{II}_{k+1}$ and/or $\bar{x}^{II}_{k+1}$ are available. Equations 457 comprise multiple equations but only one of them is needed depending on if a sum or a mean or both are available. Equation 458 is a traditional equation for calculating component $covX_{(k,l)}$ in the computation window X. Equation 459 is a traditional equation for calculating component $covX^{II}_{(k+1,l)}$ in the adjusted computation window $X^{II}$. Equations 460 are equations that may be used for directly iteratively calculating component $covX^{II}_{(k+1,l)}$ in the adjusted computation window $X^{II}$ if components $covX_{(k,l)}$, $S_k$ or $\bar{x}_k$ and $S^{II}_{k+1}$ or $\bar{x}^{II}_{k+1}$ are available. Equations 460 comprise multiple equations but only one of them is needed depending on if a sum or a mean or both are available. Equation 461 is an equation that may be used for calculating the autocorrelation $\rho^{II}_{(k+1,l)}$ for the adjusted computation window $X^{II}$ by using components $covX^{II}_{(k+1,l)}$ and $SX^{II}_{k+1}$ once they are calculated.

To demonstrate iterative autocorrelation function calculation algorithms and their comparison against traditional algorithms, three examples are given below. Three computation windows of data elements are used. For traditional algorithms, the calculations for all three computation windows are exactly the same. For iterative algorithms, initialization of one or more components is performed for the first computation window, and iterative calculations are performed for the second and third computation windows.

FIG. 5A illustrates an example of calculating an autocorrelation function at two lags (lag=1 and lag=2, i.e., maxl=2) for Big Data Set 501 using traditional algorithms. The example assumes the computation window moves from left to right. Big Data Set 501 is either a Big Data set. Computation window size 502 (n) is 4. Computation window 503 includes the first four data elements in Big Data Set 501. There are a total of 3 divisions, 9 multiplications, 9 additions, 14 subtractions when calculating the autocorrelation function at the two lags on 4 data elements without any optimization.

The same equations may be used for calculating the autocorrelation function for computation window 504 as shown in FIG. 5A Cont'd 1 and the autocorrelation for computation window 505 as shown in FIG. 5A Cont'd 2 respectively. Each of these calculations also includes a total of 3 divisions, 9 multiplications, 9 additions, 14 subtractions when calculating the autocorrelation on 4 data elements without any optimization. Traditional algorithms for calculating autocorrelation on n data elements at lags from 1 to l typically take a total of 1+l divisions, $(1+l)n-\Sigma_1^l i$ multiplications, $(2+l)(n-1)-\Sigma_1^l i$ additions, and $(1+2l)n-2\Sigma_1^l i$ subtractions without any optimization.

FIG. 5B illustrates an example of calculating an autocorrelation function at two lags (lag=1 and lag=2, i.e., maxl=2) using iterative algorithm 1. The example assumes the computation window moves from left to right and a mean instead of a sum is used in the example. The calculations for computation window 503 uses traditional equations to calculate the initial values of components $\bar{x}_1$, $SS_1$, $SX_1$, $covX_{(1,1)}$ and $covX_{(1,2)}$. The autocorrelation of computation window 503 is then calculated by using those components. Equation 402 is used for calculating component $\bar{x}_1$. Equation 414 is used for calculating component $SS_1$. Equation 417 is used for calculating component $SX_1$. Equation 420 is used for calculating component $covX_{(1,1)}$ and $covX_{(1,2)}$ respectively. Equation 423 is used for calculating component $\rho_{(1,1)}$ and $\rho_{(1,2)}$ respectively. The autocorrelation $\rho_{(1,1)}$ for computation window 503 at lag=1 is calculated by using $covX_{(1,1)}$ and $SX_1$, and the autocorrelation $\rho_{(1,2)}$ for computation window 503 at lag=2 is calculated by using $covX_{(1,2)}$ and $SX_1$. There is a total of 3 divisions, 11 multiplications, 9 additions and 11 subtractions when calculating the autocorrelation function at lag=1 and lag=2 for a computation window of size 4.

However, starting from computation window 504, the components of the autocorrelation function at lag=1 and lag=2 for computation window 504 may be iteratively calculated from the components of the autocorrelation for computation window 503. For example, equation 411 may be used for directly iteratively calculating the component $\bar{x}_2$ by using $\bar{x}_1$ previously calculated for computation window 503. Equation 416 may be used for directly iteratively calculating the component $SS_2$ by using $SS_1$ previously calculated for computation window 503. Equation 419 may be used for indirectly iteratively calculating the component $SX_2$ by using $SS_2$ and $\bar{x}_2$. Equation 422 may be used for directly iteratively calculating the component $covX_{(2,1)}$ (lag=1) by using $\bar{x}_1$ and $covX_{(1,1)}$ (lag=1) previously calculated for computation window 503 and $\bar{x}_2$. Equation 422 may also be used for directly iteratively calculating the component $covX_{(2,2)}$ (lag=2) by using $\bar{x}_1$ and $covX_{(1,2)}$ (lag=2) previously calculated for computation window 503 and $\bar{x}_2$. Equation 423 may be used for indirectly iteratively calculating the autocorrelation $\rho_{(2,1)}$ at lag=1 by using $covX_{(2,1)}$ and $SX_2$ and the autocorrelation $\rho_{(2,2)}$ at lag=2 by using $covX_{(2,2)}$ and $SX_2$. There is a total of 3 divisions, 16 multiplications, 16 additions and 11 subtractions when calculating the autocorrelation function at lag=1 and lag=2 for a computation window of size 4.

The same equations may also be used for iteratively calculating the components of autocorrelation at lag=1 and lag=2 for computation window 505 from the components of autocorrelation for computation window 504. There is also a total of 3 divisions, 16 multiplications, 16 additions and 11 subtractions when iteratively calculating the components of autocorrelation. As such, since the number of operations performed by the iterative autocorrelation function calculation algorithm is fixed and not changing with the computation window size, starting from computation window 504, the number of operations used when iteratively calculating the autocorrelation function is (potentially substantially) less than when using traditional equations for computation windows with a large size.

FIG. 5C illustrates an example of calculating autocorrelation function at a range of two lags (lag=1 and lag=2, i.e., maxl=2) using iterative algorithm 2. The example assumes the computation window moves from left to right and a mean instead of a sum is used in the example. The calculations of calculating an autocorrelation function for computation window 503 uses traditional equations to calculate the initial values of components $\bar{x}_1$, $SX_1$, $covX_{(1,1)}$ and $covX_{(1,2)}$. For example, equation 402 may be used for calculating $\bar{x}_1$. Equation 434 may be used for calculating $SX_1$. Equation 437 may be used for calculating $covX_{(1,1)}$ and $covX_{(1,2)}$. The autocorrelation of computation window 503 $\rho_{(1,1)}$ (lag=1) and $\rho_{(1,2)}$ (lag=2) is then calculated by using those components through equation 440 respectively. There is a total of 3 divisions, 9 multiplications, 9 additions and 14 subtractions when calculating the autocorrelation function at lag=1 and lag=2 for a computation window of size 4.

However, starting from computation window 504, the components of the autocorrelation function at lag=1 and lag=2 for computation window 504 may be iteratively calculated from the components of the autocorrelation for computation window 503. For example, equation 411 may be used for directly iteratively calculating the component $\bar{x}_2$ by using $\bar{x}_1$ previously calculated for computation window 503. Equation 436 may be used for directly iteratively calculating the component $SX_2$ by using $SX_1$ and $\bar{x}_2$. Equation 439 may be used for directly iteratively calculating the component $covX_{(2,1)}$ (lag=1) by using $\bar{x}_1$, $\bar{x}_2$ and $covX_{(1,1)}$. Equation 439 may also be used for directly iteratively calculating the component $covX_{(2,2)}$ (lag=2) by using $\bar{x}_1$, $\bar{x}_2$ and $covX_{(1,2)}$. Equation 440 may then be used for indirectly iteratively calculating the autocorrelations $\rho_{(2,1)}$ (lag=1) by using $covX_{(2,1)}$ and $SX_2$ and $\rho_{(2,2)}$ (lag=2) by using $covX_{(2,2)}$ and $SX_2$. There is a total of 3 divisions, 13 multiplications, 18 additions and 11 subtractions when calculating the autocorrelation function at lag l=1 and lag l=2 on a computation window of size 4.

The same equations may also be used for iteratively calculating the components of autocorrelation for computation window 505 from the components of autocorrelation for computation window 504. There is a total of 3 divisions, 13 multiplications, 18 additions and 11 subtractions when iteratively calculating the autocorrelation function. As such, since the number of operations performed by the iterative autocorrelation function calculation algorithm is fixed and not changing with the computation window size, starting from computation window 504, the number of operations used when iteratively calculating the autocorrelation function is (potentially substantially) less than when using traditional equations for computation windows with a large size.

FIG. 5D illustrates an example of calculating an autocorrelation function at a range of two lags (lag=1 and lag=2, i.e., maxl=2) using iterative algorithm 3. The example assumes the computation window moves from left to right and a mean instead of a sum is used in the example. The calculations for computation window 503 uses traditional equations to calculate the initial values of components $\bar{x}_1$, $SX_1$, $covX_{(1,1)}$ and $covX_{(1,2)}$. For example, equation 402 may be used for calculating $\bar{x}_1$. Equation 448 may be used for calculating $SX_1$. Equation 451 may be used for calculating $covX_{(1,1)}$ and $covX_{(1,2)}$. Equation 454 may then be used for calculating the autocorrelation function of computation window 503 $\rho_{(1,1)}$ (lag=1) by using $covX_{(1,1)}$ and $SX_1$ and $\rho_{(1,2)}$ (lag=2) by using $covX_{(1,2)}$ and $SX_1$. There is a total of 3 divisions, 9 multiplications, 9 additions and 14 subtractions when calculating the autocorrelation function at lag=1 and lag=2 for a computation window of size 4.

However, for window 504, the components of the autocorrelation function at lag=1 and lag=2 for computation window 504 may be iteratively calculated from the components of the autocorrelation function for computation window 503. For example, equation 411 may be used for directly iteratively calculating the component $\bar{x}_2$ by using previously calculated for computation window 503. Equation 450 may be used for directly iteratively calculating the component $SX_2$ by using $SX_1$, $\bar{x}_1$ and $\bar{x}_2$. Equation 453 may be used for directly iteratively calculating the component $covX_{(2,1)}$ by using and $covX_{(1,1)}$. Equation 453 may also be used for directly iteratively calculating the component $covX_{(2,2)}$ by using $x_1$, $x_2$, and $covX_{(1,2)}$. Equation 454 may then be used for indirectly iteratively calculating the autocorrelation function $\rho_{(2,1)}$ (lag=1) by using $covX_{(2,1)}$ and $SX_2$ and $\rho_{(2,2)}$ (lag=2) by using $covX_{(2,2)}$ and $SX_2$ respectively. There is a total of 3 divisions, 13 multiplications, 15 additions and 13 subtractions when calculating the autocorrelation function.

The same equations may also be used for iteratively calculating the components of autocorrelation function for computation window 505 from the components of autocorrelation function for computation window 504. There is also a total of 3 divisions, 13 multiplications, 15 additions and 13 subtractions when iteratively calculating the autocorrelation function. As such, since the number of operations performed by the iterative autocorrelation function calculation algorithm is fixed and not changing with the computation window size, starting from since the number of operations performed by the iterative autocorrelation function calculation algorithm is fixed and not changing with the computation window size, starting from computation window 504, the number of operations used when iteratively calculating the autocorrelation function is (potentially substantially) less than when using traditional equations for computation windows with a large size.

In the three examples above, a mean is used for the iterative autocorrelation function calculation. If a sum instead of a mean is used, autocorrelation may also be iteratively calculated though the numbers of operations are different. Also, the computation window moves from left to right in the three examples above. It works in a similar way when the computation window moves from right to left but just use a different set of equations.

FIG. 6 illustrates computational loads for traditional autocorrelation function algorithm and iterative autocorrelation function algorithms when n=4 and maxl=2. As depicted, the computation loads are roughly at same level for traditional autocorrelation function algorithms and iterative autocorrelation function algorithms for computation windows of size 4.

FIG. 7 illustrates computational loads for traditional autocorrelation function algorithm and iterative autocorrelation function algorithms when n=1,000,000 and maxl=2 for any computation window other than the first computation window. As depicted, there are substantially fewer multiplication operations, fewer addition operations, and fewer subtraction operations using any one of the iterative algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing-system-implemented method for generating an autocorrelation function at a specified range of lags for an adjusted computation window of a data set at a computing-device-based computing system, the computing-device-based computing system comprising one or more computing devices and one or more storage media, each of the computing devices comprising one or more processors, the method comprising:

initializing, by the computing-device-based computing system, multiple components of an autocorrelation function at a specified range of lags for a pre-adjusted computation window with a specified size n of a data set on the one or more storage media, wherein the pre-adjusted computation window contains n data elements of the data set;

accessing or receiving, by the computing-device-based computing system, a data element to be removed from the pre-adjusted computation window and a data element to be added to the pre-adjusted computation window;

adjusting, by the computing-device-based computing system, the pre-adjusted computation window by:
removing the to be removed data element from the pre-adjusted computation window; and
adding the to be added data element to the pre-adjusted computation window;

directly iteratively deriving, by the computing-device-based computing system and based at least in part on the multiple components of the autocorrelation function at the specified range of lags for the pre-adjusted computation window, multiple components of an autocorrelation function at the specified range of lags for the adjusted computation window, wherein the directly iteratively deriving includes:
deriving each of the multiple components of an autocorrelation function at the specified range of lags for the adjusted computation window by removing any contribution of the removed data element from each of the multiple components of the autocorrelation function at the specified range of lags for the pre-adjusted computation window mathematically and adding any contribution of the added data element to each of the multiple components of the autocorrelation function at the specified range of lags for the pre-adjusted computation window mathematically; and generating, by the computing-device-based computing system and based at least in part on two or more of the iteratively derived components, an autocorrelation function at the specified range of lags for the adjusted computation window.

2. The computing-system-implemented method of claim 1, wherein the accessing or receiving a data element to be removed and a data element to be added further comprises accessing or receiving a plurality of z (z>1) data elements to be removed from the pre-adjusted computation window and accessing or receiving a plurality of z (z>1) data elements to be added to the pre-adjusted computation window, and wherein the method further comprises performing, for each of the respective z data elements to be removed and each of the respective z data elements to be added, adjusting the pre-adjusted computation window, directly iteratively deriving the multiple components, and generating an autocorrelation function at the specified range of lags for the adjusted computation window for each of multiple data elements to be removed and each of multiple data elements to be added.

3. The computing-system-implemented method of claim 2, wherein the directly iteratively deriving the multiple components comprises performing a loop, the loop comprising for each given lag l within the specified range of lags:
   accessing, by the computing-device-based computing system, l data elements from each side of the pre-adjusted computation window without counting the added data element and the removed data element;
   accessing, by the computing-device-based computing system, one or more components of an autocorrelation at lag l for the pre-adjusted computation window; and
   calculating one or more components of an autocorrelation at the specified range of lags for the adjusted computation window by removing any contribution of the removed data element from each of the one or more accessed components mathematically and adding any contribution of the added data element to each of the one or more accessed components mathematically, by the computing-device-based computing system, based at least in part on the removed data element, the added data element, the accessed data elements, and the accessed components.

4. The computing-system-implemented method of claim 3, wherein the loop further comprises for each given lag l within the specified range of lags storing the one or more calculated components into one or more storage media.

5. The computing-system-implemented method of claim 2, wherein the generating an autocorrelation function at the specified range of lags for the adjusted computation window comprises generating an autocorrelation function at the specified range of lags for the adjusted computation window only when the autocorrelation function is accessed.

6. The computing-system-implemented method of claim 5, wherein the generating the autocorrelation function at the specified range of lags for the adjusted computation window comprises indirectly iteratively deriving, by the computing-device-based computing system, one or more components of an autocorrelation function at the specified range of lags for the adjusted computation window, wherein the indirectly iteratively deriving the one or more components includes individually calculating each respective one of the one or more components based on one or more components other than the respective one component.

7. A computing system, the computing system comprising:
   one or more computing devices;
   each of the one or more computing devices comprising one or more processors;
   at least one storage medium that has stored a data set; and
   one or more calculation modules that, when executed by at least one of the one or more computing devices, determine an autocorrelation function at a specified range of lags for an adjusted computation window of the data set, wherein the determination of the autocorrelation function includes to:
   a. initialize multiple components of an autocorrelation function at the specified range of lags for a pre-adjusted computation window with a specified size of the data set;
   b. access or receive a data element to be removed from the pre-adjusted computation window and a data element to be added to the pre-adjusted computation window;
   c. adjust the pre-adjusted computation window, including:
      remove the to be removed data element from the pre-adjusted computation window; and
      add the to be added data element to the pre-adjusted computation window;
   d. directly iteratively calculate multiple components of an autocorrelation function at the specified range of lags for the adjusted computation window, including:
      access the multiple components of the autocorrelation function at the specified range of lags for the pre-adjusted computation window; and
      calculate each of the multiple components of an autocorrelation function at the specified range of lags for the adjusted computation window by removing any contribution of the removed data element from each of the accessed components mathematically and adding any contribution of the added data element to each of the accessed components mathematically; and
   e. generate an autocorrelation function at the specified range of lags for the adjusted computation window based on two or more of the iteratively calculated components.

8. The computing system of claim 7, wherein the one or more calculation modules, when executed by at least one of the one or more computing devices, perform b, c, d, and e multiple times.

9. The computing system of claim 7, wherein the one or more calculation modules, when executed by at least one of the one or more computing devices, perform b, c, and d multiple times.

10. The computing system of claim 8, wherein the performing d comprises performing a loop, the loop comprising for each given lag l within the specified range of lags:
    accessing l data elements from each side of the pre-adjusted computation window without counting the added data element and the removed data element;
    accessing one or more components of an autocorrelation at lag l for the pre-adjusted computation window; and
    calculating one or more components of an autocorrelation at the specified range of lags for the adjusted computation window by removing any contribution of the removed data element from each of the one or more accessed components mathematically and adding any contribution of the added data element to each of the one or more accessed components mathematically based at least in part on the removed data element, the added data element, the accessed data elements, and the accessed components.

11. The computing system of claim 10, wherein the loop further comprises storing the one or more calculated components into one or more storage media.

12. The computing system of claim 8, wherein to performing e comprises generating an autocorrelation function at the specified range of lags for the adjusted computation window only when the autocorrelation function is accessed.

13. The computing system of claim 12, wherein the generating an autocorrelation function further comprises indirectly iteratively calculating one or more components of the autocorrelation function, wherein the indirectly iteratively calculating one or more components includes individually calculating each respective one of the one or more components based on one or more components other than the respective one component.

14. A computing system program product for use at a configured computing system that comprises computing devices and one or more storage media, each of the computing devices comprising one or more processors, the computing system program product for implementing a method for generating an autocorrelation function at a specified range of lags for an adjusted computation window, the computing system program product comprising one or more computing device storage media having stored thereon computing-system-executable instructions that, when executed by at least one of the computing devices in the configured computing system, cause the configured computing system to perform the method, wherein the method including steps to:

initialize, by the configured computing system, multiple components of an autocorrelation function at a specified range of lags for a pre-adjusted computation window with a specified size of a data set on at least one of the one or more storage media;

access or receive, by the configured computing system, a data element to be removed from the pre-adjusted computation window and a data element to be added to the pre-adjusted computation window;

adjust, by the configured computing system, the pre-adjusted computation window, by removing the to be removed data element from the pre-adjusted computation window and adding the to be added data element to the pre-adjusted computation window;

directly iteratively calculate, by the configured computing system, multiple components of an autocorrelation function at a specified range of lags for the adjusted computation window, including:

calculate each of the multiple components by removing any contribution of the removed data element from each of the multiple components of the autocorrelation function at the specified range of lags for the pre-adjusted computation window mathematically and adding any contribution of the added data element to each of the multiple components of the autocorrelation function at the specified range of lags for the pre-adjusted computation window mathematically; and generate, by the configured computing system, an autocorrelation function at the specified range of lags for the adjusted computation window based on two or more of the iteratively calculated components.

15. The computing system program product of claim 14, wherein the generating the autocorrelation function further comprises to indirectly iteratively calculate, by the configured computing system, one or more components of the autocorrelation function at the specified range of lags for the adjusted computation window, wherein the indirectly iteratively calculating the one or more components includes individually calculating each respective one of the one or more components based on one or more components other than the respective one component.

16. The computing system program product of claim 14, wherein the computing-system-executable instructions that, when executed, further cause the configured computing system to access or receive a data element to be removed and a data element to be added, to adjust the pre-adjusted computation window, to directly iteratively calculate the multiple components, and to generate an autocorrelation function at the specified range of lags for the adjusted computation window as needed for each of multiple data elements to be removed and each of multiple data elements to be added.

17. The computing system program product of claim 14, wherein the computing-device-executable instructions that, when executed, further cause the configured computing system to access or receive a data element to be removed and a data element to be added, to adjust the pre-adjusted computation window, and to directly iteratively calculate the multiple components for the adjusted computation window for each of multiple data elements to be removed and each of multiple data elements to be added.

18. The computing system program product of claim 16, wherein computing-device-executable instructions that, when executed, cause the configured computing system to directly iteratively calculate the multiple components comprise computing-device-executable instructions that, when executed, cause the configured computing system to perform a loop, the loop comprising for each given lag l within the specified range of lags:

accessing l data elements from each side of the pre-adjusted computation window without counting the added data element and the removed data element;

accessing one or more components of an autocorrelation at lag l for the pre-adjusted computation window; and calculating one or more components of an autocorrelation at the specified range of lags for the adjusted computation window by removing any contribution of the removed data element from each of the one or more accessed components mathematically and adding any contribution of the added data element to each of the one or more accessed components mathematically based at least in part on the removed data element, the added data element, the accessed data elements, and the accessed components.

19. The computing system program product of claim 18, wherein the computing-device-executable instructions that, when executed, cause the configured computing system to perform a loop further comprise computing-device-executable instructions that, when executed, cause the configured computing system to store the one or more calculated components into one or more storage media within the loop.

20. The computing system program product of claim 16, wherein the computing-device-executable instructions that, when executed, cause the configured computing system to generate an autocorrelation function comprise computing-device-executable instructions that, when executed, further cause the configured computing system to indirectly iteratively calculate one or more components of the autocorrelation function, wherein the indirectly iteratively calculating the one or more components includes individually calculating each respective one of the one or more components based on one or more components other than the respective one component.

* * * * *